United States Patent
Hijikata et al.

(10) Patent No.: US 6,553,506 B1
(45) Date of Patent: Apr. 22, 2003

(54) INFORMATION PROCESSING DEVICE AND ELECTRONIC EQUIPMENT

(75) Inventors: Yoichi Hijikata, Suwa (JP); Makoto Kudo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/424,616

(22) PCT Filed: Mar. 31, 1999

(86) PCT No.: PCT/JP99/01650

§ 371 (c)(1),
(2), (4) Date: Feb. 22, 2000

(30) Foreign Application Priority Data

Mar. 31, 1998 (JP) .......................................... 10-104038

(51) Int. Cl.⁷ ................................................. G06F 1/04
(52) U.S. Cl. ........................... 713/501; 713/400; 714/25
(58) Field of Search ................................ 713/400, 500, 713/501, 503, 600; 714/25, 28, 30

(56) References Cited

U.S. PATENT DOCUMENTS

| | | | |
|---|---|---|---|
| 4,641,348 A | * | 2/1987 | Neuder et al. |
| 5,353,434 A | * | 10/1994 | Katayama |
| 5,680,543 A | * | 10/1997 | Bhawmik |
| 5,917,872 A | * | 6/1999 | Ching |
| 6,009,531 A | * | 12/1999 | Selvidge et al. |

FOREIGN PATENT DOCUMENTS

| | | |
|---|---|---|
| JP | 58-40642 | 3/1983 |
| JP | 63-303437 | 12/1988 |
| JP | 64-3745 | 1/1989 |
| JP | 2-33238 | 2/1990 |
| JP | 7-271926 | 10/1995 |

\* cited by examiner

Primary Examiner—Dennis M. Butler
(74) Attorney, Agent, or Firm—Oliff & Berridge, PLC

(57) ABSTRACT

An objective is to provide information processing device and electronic equipment that is capable of transferring data rapidly while using start-stop synchronization. A communication section (142) comprised within a microcomputer (140) comprises a frequency division circuit (146) that divides a BCLK signal to generate an SMC1 signal (a clock signal for sampling each bit of data sent by start-stop synchronization) and a send/receive circuit (144) for transmitting data based on SMC1. The communication section (142) supplies the BCLK signal to a debugging tool (150) as a signal for enabling a frequency division circuit (156) to generate another signal SMC2. A division ratio control section (158) changes a division ratio FD2 in accordance with the frequency of BCLK and transfers division ratio data to the communication section (142), and the division ratio control section (148) changes a division ratio FD1 in the frequency division circuit (146) based on this division ratio data. This ensures that data can always be transferred at the most suitable fast communication speed. The BCLK signal can also be used as a sampling clock signal for trace data in user program execution mode.

12 Claims, 20 Drawing Sheets

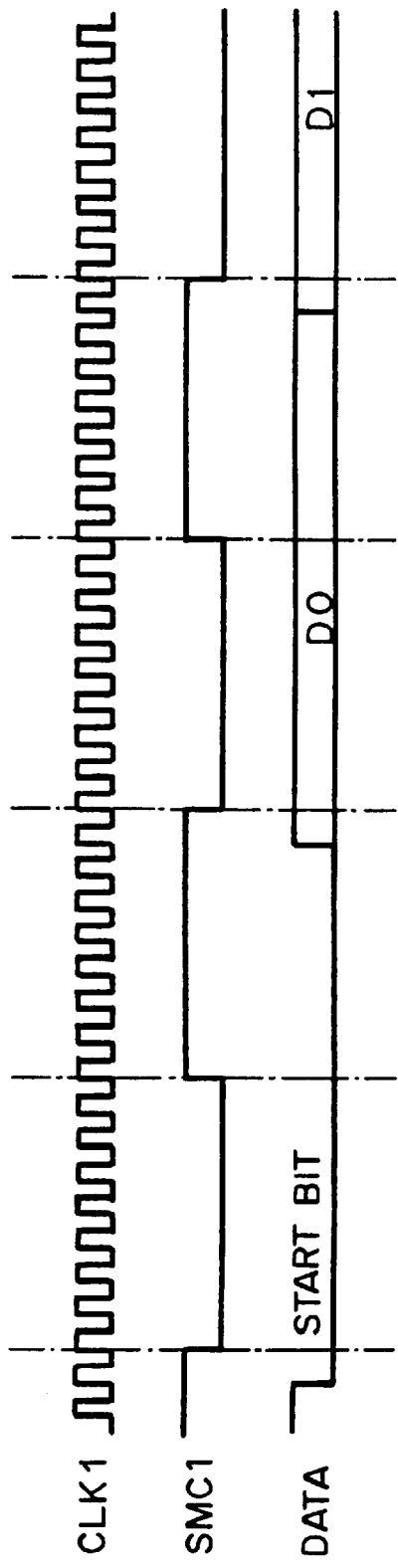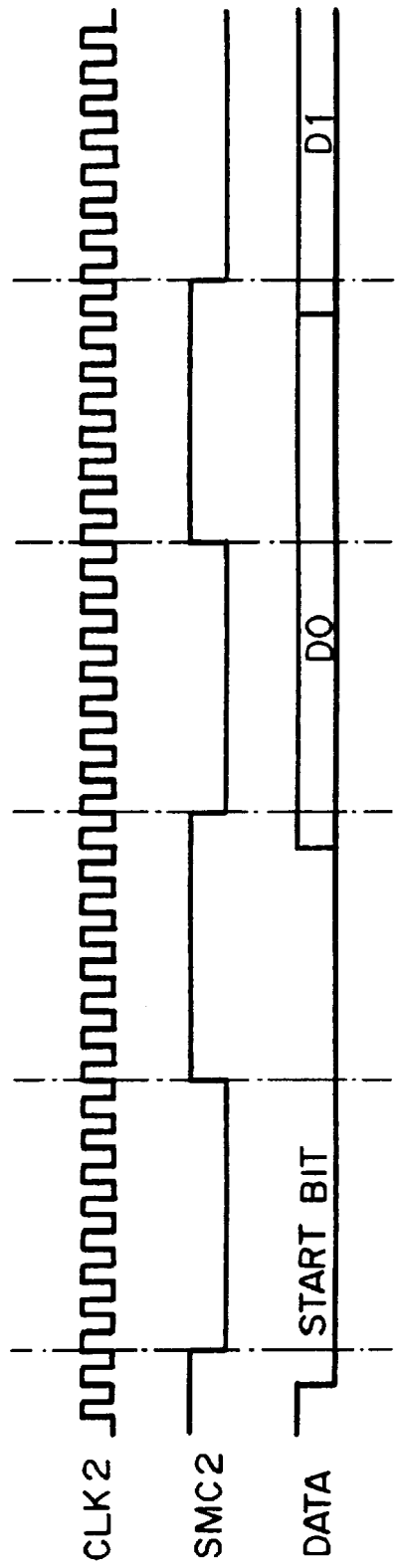

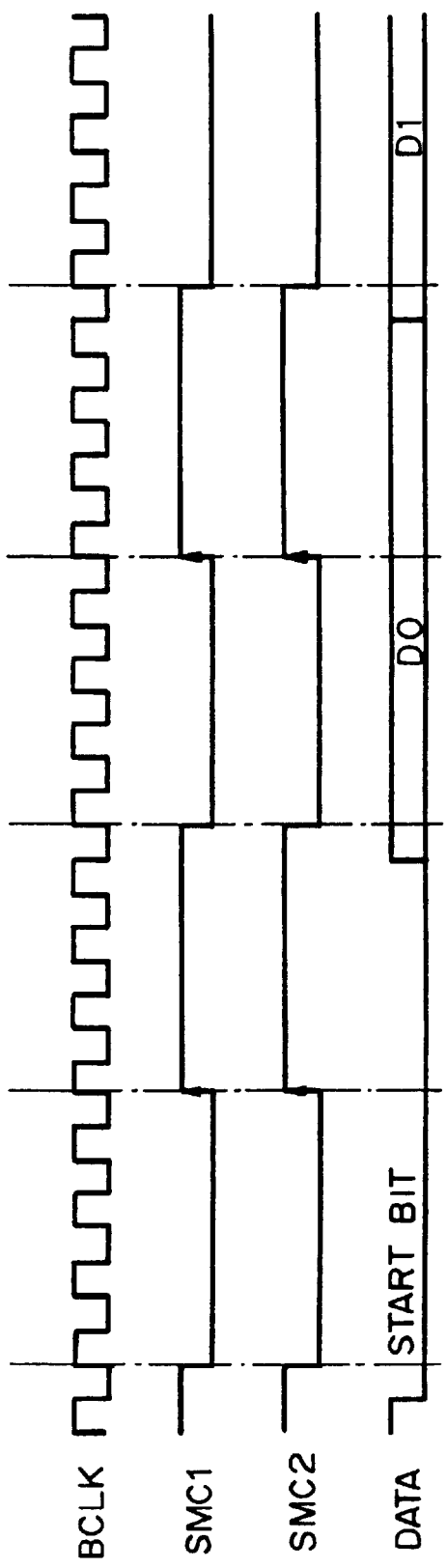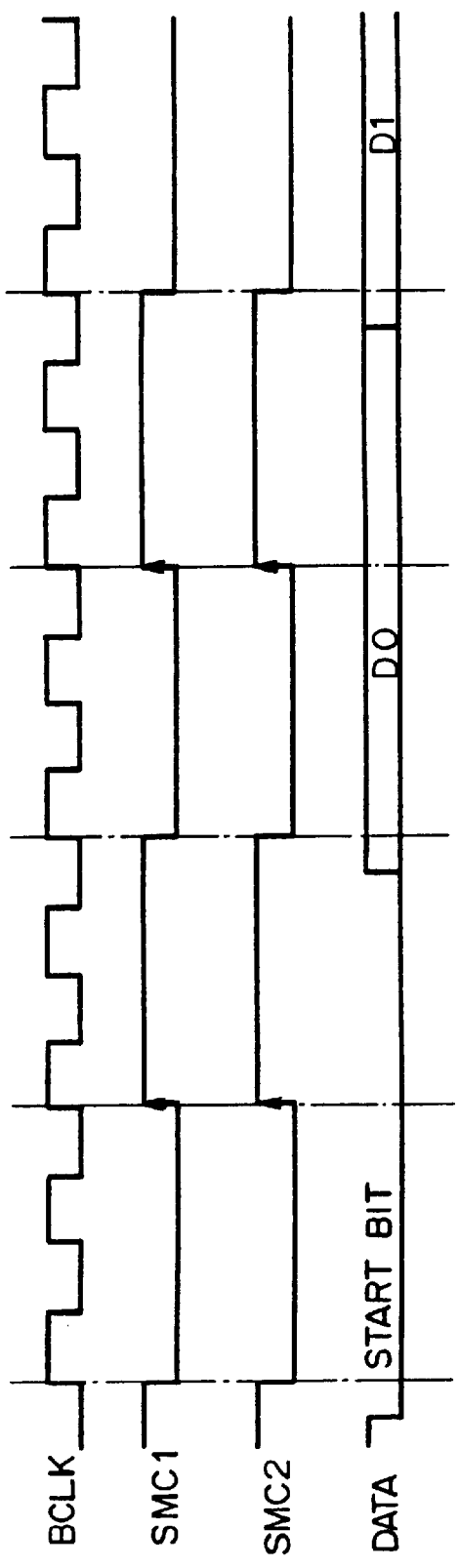

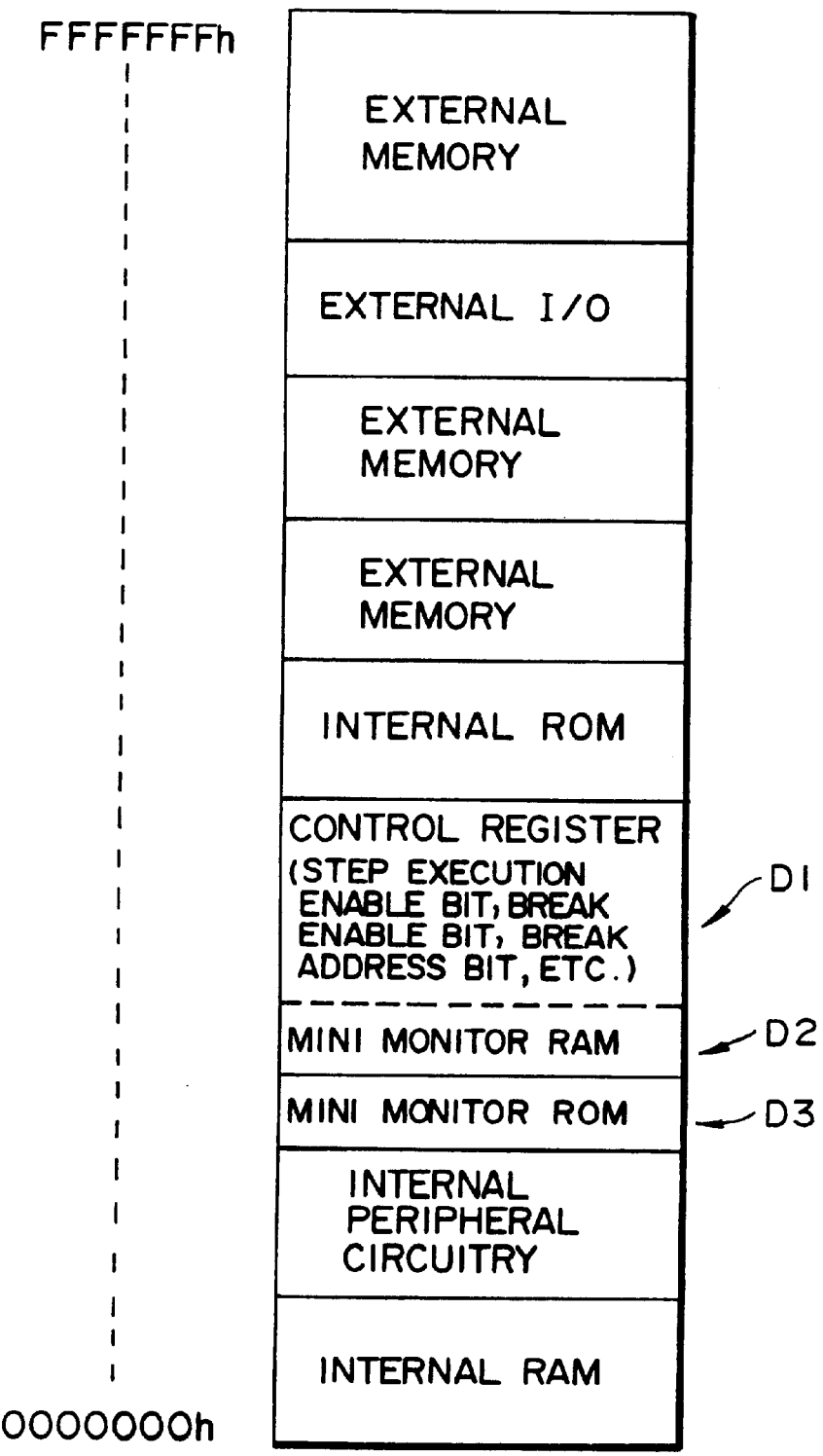

FIG. 13A
PROGRAM LOAD (8001Oh, 12 BYTES, ADD---, SUB---
AND---, OR---, XOR---, LD.W---)

⇨ WRITE (80010h, ADD---, SUB---)
+WRITE (80014h, ADD---, OR---)
+WRITE (80018h, XOR---, LD.W---)

FIG. 13B
STEP EXECUTION ⇨ WRITE TO STEP EXECUTION ENABLE BIT IN CONTROL REGISTER
+GO

FIG. 13C
INTERNAL REGISTER READ ⇨ READ OF MONITOR RAM IN MEMORY MAP

FIG. 13D
BREAKPOINT SETTING ⇨ WRITE TO BREAK ENABLE BIT AND BREAK ADDRESS BIT OF CONTROL REGISTER

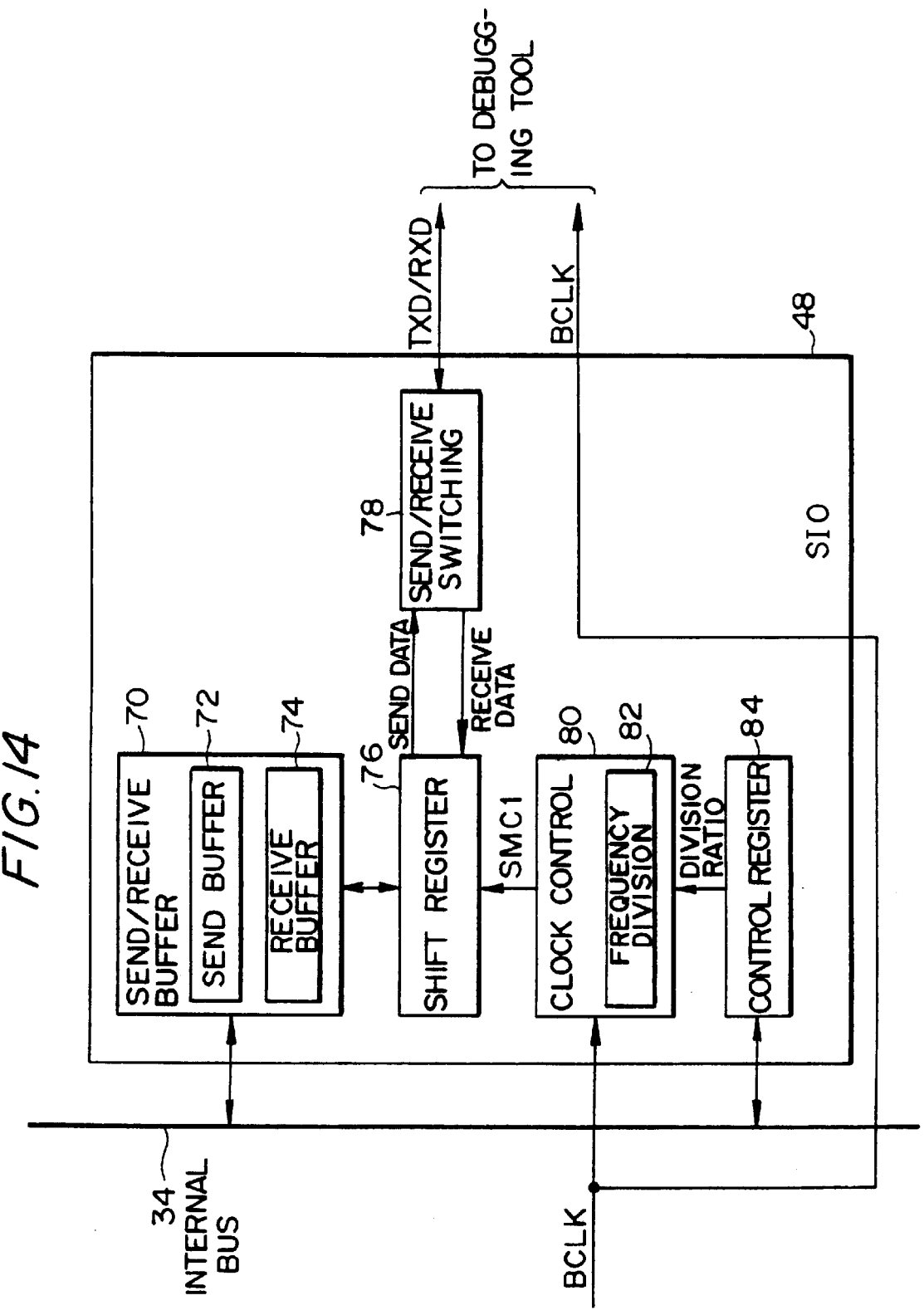

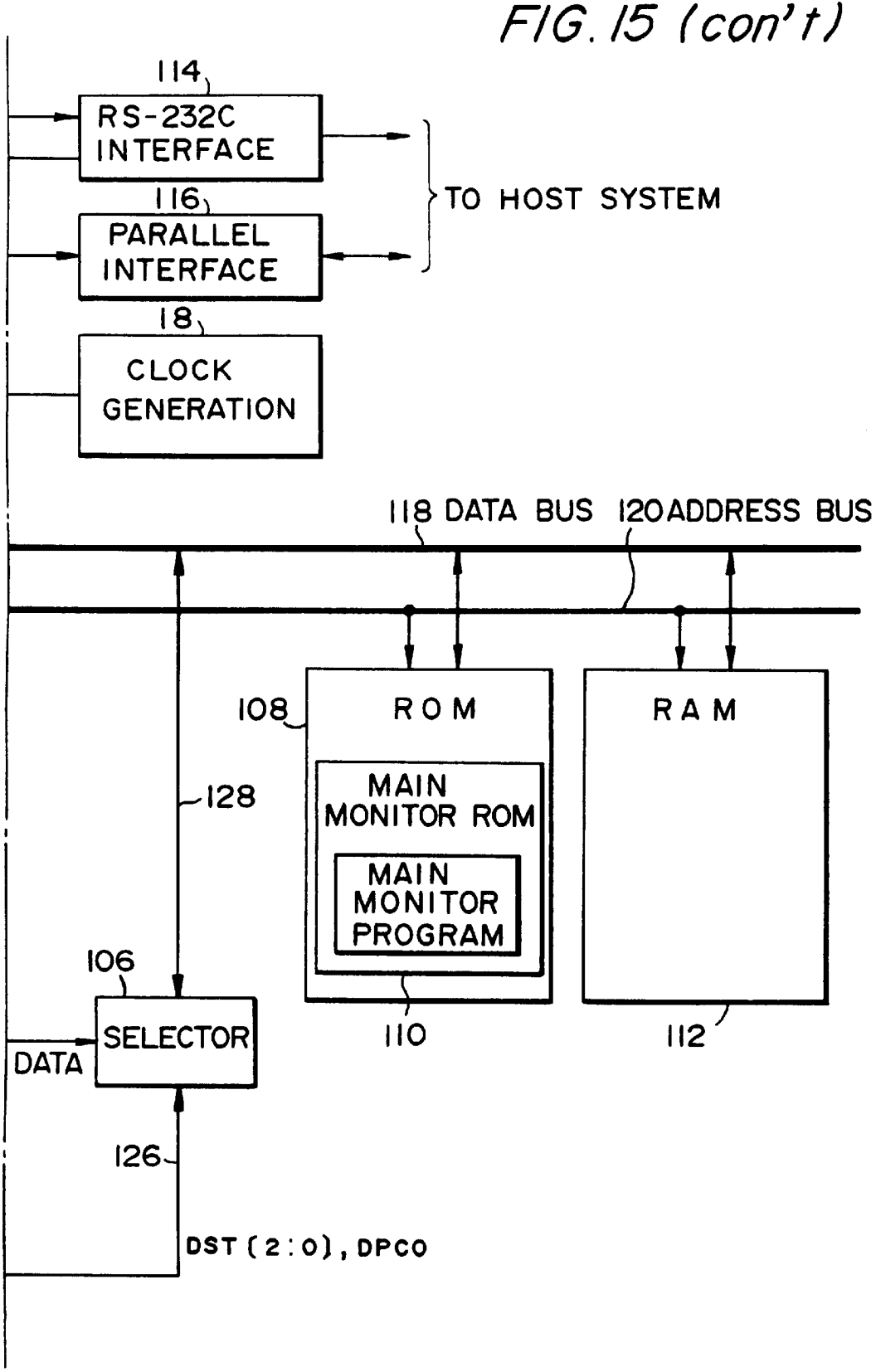
FIG. 15 (con't)

DEBUGGING MODE (AFTER SHIFT TO BREAK SPACE)

USER PROGRAM EXECUTION MODE (AFTER SHIFT TO USER SPACE)

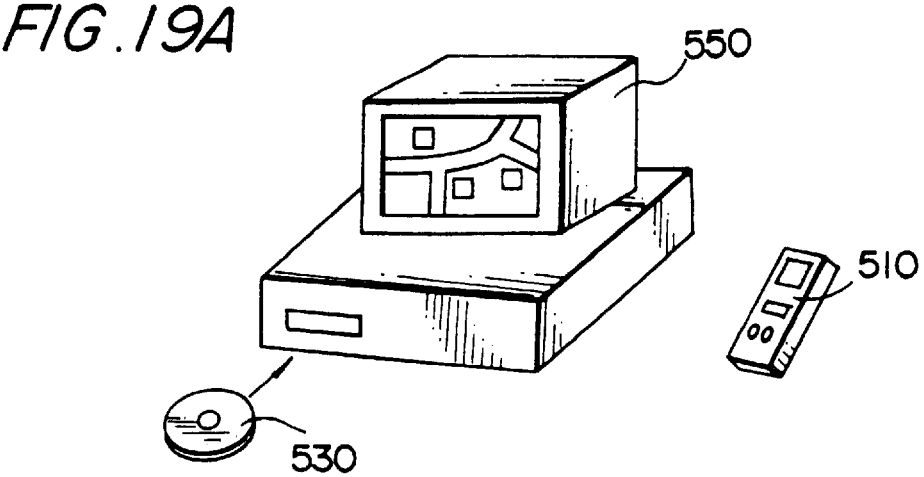
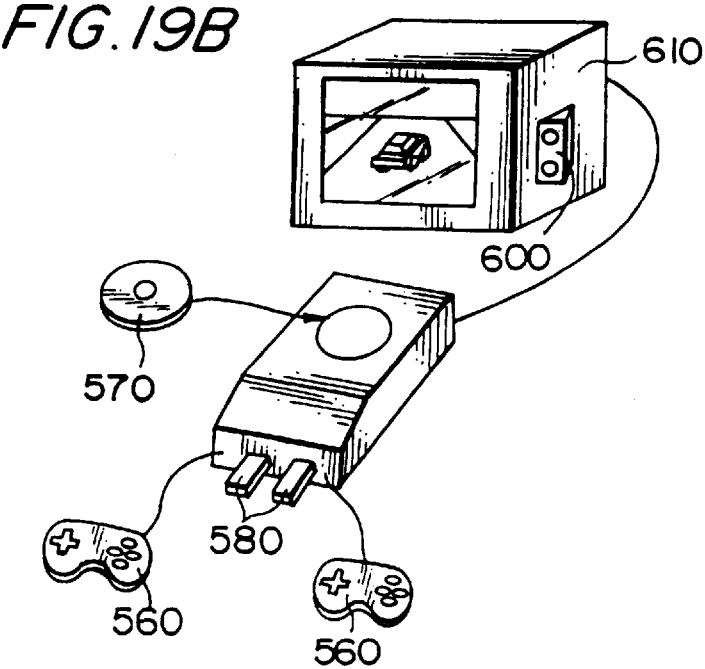
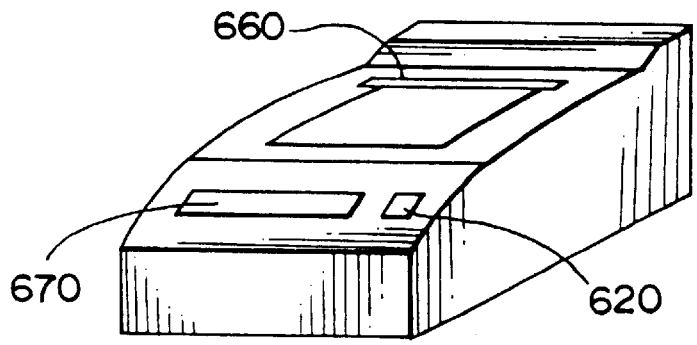

INFORMATION PROCESSING DEVICE AND ELECTRONIC EQUIPMENT

TECHNICAL FIELD

This invention relates to an information processing device and electronic equipment.

BACKGROUND OF ART

There has recently been increasing demand for the incorporation of microcomputers that are capable of implementing high-level information processing into electronic equipment such as game machines, car navigation systems, printers, and portable information terminals. The thus-incorporated microcomputer is usually mounted on a user board that is called a target system. A software development support tool called an in-circuit emulator (ICE) is widely used for supporting the development of software to be used in the target system.

With an ICE, it is necessary to transfer data for debugging, between the microcomputer installed in the target system and the external debugging tool. In such a case, a method called the synchronous method or another called start-stop synchronization is used as the transfer method. It is also desirable with an ICE that there are as few communication lines between the microcomputer and the debugging tool as possible. In addition, it is desirable that there should be as few sampling errors in the transferred data as possible.

However, if transfer is by the synchronous method, it is necessary to provide four communication lines between a microcomputer 340 (an information processing device) and a debugging tool 342 (a second information processing device), as shown in FIG. 1A. In other words, it is necessary to have a TXD line (for send data), a TCLK line (for a TXD sampling clock signal), an RXD line (for receive data), and an RCLK line (for an RXD sampling clock signal). Thus the number of communication lines increases unnecessarily.

If transfer is by start-stop synchronization, on the other hand, the microcomputer 340 and the debugging tool 342 each have a clock signal of substantially the same frequency, as shown in FIG. 1B. Assume, by way of example, that the microcomputer 340 has a clock signal CLK1 and the debugging tool 342 has a clock signal CLK2, where CLK1 and CLK2 have substantially the same frequency. The microcomputer 340 generates a sampling clock signal SMC1 by dividing the frequency of CLK1, and uses this SMC1 to sample each bit of data (start bit, data bits D0 to D7, and stop bit) that is transferred by start-stop synchronization, as shown in FIG. 2A. Similarly, the debugging tool 342 generates a sampling clock signal SMC2 by dividing the frequency of CLK2, and uses this SMC2 to sample each bit of data (start bit, data bits D0 to D7, and stop bit) that is transferred by start-stop synchronization, as shown in FIG. 2B.

However, with this start-stop synchronization, if the operating frequency of the CPU comprised within the microcomputer 340 increases and thus the frequencies of CLK1 and CLK2 increase, the frequencies of SMC1 and SMC2 also increase and thus it is more likely that sampling errors will occur in the transferred data. Conversely, it is not possible to increase the frequencies of SMC1 and SMC2 to any level at which sampling errors occur in the transferred data. This means that it is not possible to debug the microcomputer 340 in an environment in which it operates at a high speed. In other words, the clock frequency of microcomputer must be reduced during debugging.

DISCLOSURE OF THE INVENTION

This invention was devised in the light of the above described technical problems, and has as an objective thereof the provision of an information processing device and electronic equipment that are capable to transferring data rapidly by start-stop synchronization.

In order to solve the above technical problems, this invention relates to an information processing device comprising a first communication means for transferring data by start-stop synchronization to and from a second communication means comprised within a second external information processing device, wherein the first communication means comprises: a first frequency division circuit for dividing the frequency of a first clock signal to generate a first sampling clock signal for sampling each bit of data transferred by start-stop synchronization; and a circuit for performing at least one of data reception and transmission, based on the first sampling clock signal; and wherein the first communication means supplies the first clock signal to the second information processing device as a signal that enables a second frequency division circuit comprised within the second communication means to generate a second sampling clock signal.

In this aspect of the invention, a first clock signal is used in common by the information processing device and the second information processing device. The first and second sampling clock signals are generated by dividing the frequency of this common first clock signal. The information processing device uses the first sampling clock signal to sample the bits of data that is transferred by start-stop synchronization, and the second information processing device uses the second sampling clock signal to sample the bits of data that is transferred by start-stop synchronization. It is therefore possible to prevent any slippage between the frequencies of these first and second sampling clock signals, which makes it possible to prevent the occurrence of sampling errors in the transferred data, in an efficient manner. As a result, it is possible to transfer data at the most suitable fast communication speed.

The first communication means may comprise a first division ratio control means for controlling the division ratio in the first frequency division circuit; and a second division ratio control means comprised within the second communication means changes the division ratio in accordance with the frequency of the first clock signal, and wherein when division ratio data which indicates the changed division ratio has been transferred to the first communication means, the first division ratio control means may change the division ratio in the first frequency division circuit based on the transferred division ratio data. This configuration ensures that, if the frequency of the first clock signal falls, the division ratio can be made small accordingly. This makes it possible to prevent the frequencies of the first and second sampling clock signals from falling too far, and also prevent the communication speed from falling. As a result, data can always be transferred at the most suitable fast communication speed, regardless of the magnitude of the frequency of the first clock signal.

The information processing device of this invention may further comprise a central processing unit for executing instructions; wherein the first communication means transfers data for debugging to and from the second information processing device that acts as a debugging tool. This configuration makes it possible to keep the speed with which data is transferred between the microcomputer (information processing device) and the debugging tool (second information processing device) at the optimal high speed. In particular, the clock frequency of the microcomputer often varies with each user who is using this microcomputer. The transfer speed for data therefore also changes with such changes in the clock frequency of the microcomputer. However, this aspect of the invention ensures that the first and second division ratios also change if the user of the microcomputer changes the clock frequency of the microcomputer. As a result, transfer can be done at the optimal communication speed in accordance with clock signals of various frequencies that the user can use, without lowering the communication speed in the end.

In the information processing device of this invention, the first clock signal may be used as a clock signal for sampling trace data after a transition from a debugging mode to a user program execution mode. This configuration makes it unnecessary to provide a new clock signal terminal for sampling trace data. It is therefore possible to design the information processing device to have a lower cost.

Electronic equipment in accordance with this invention comprises the above described information processing device; an input source of data to be processed by the information processing device; and an output device for outputting data that has been processed by the information processing device. This configuration ensures that the debugging of programs that will run in the electronic equipment can be done efficiently, shortening the development period of the electronic equipment and reducing costs. It is also possible to debug user programs in an environment that is the same as the environment in which the information processing device actually operates, thus increasing the reliability of the electronic equipment.

BRIEF DESCRIPTION OF DRAWINGS

FIGS. 2A and 2B show timing waveforms of a clock signal, a sampling clock signal, and sampling data under generic start-stop synchronization;

FIGS. 6A and 6B show timing waveforms of a clock signal, a sampling clock signal, and sampling data in accordance with the method of FIG. 5;

FIG. 12 shows the memory map in debugging mode;

FIGS. 13A to 13D illustrate the processing involved in the conversion (decomposing) of debugging commands into primitive commands;

FIG. 14 is a functional block diagram of an example of the structure of the SIO;

FIGS. 19A to 19C show external views of the electronic equipment.

BEST MODE FOR CARRYING OUT THE INVENTION

Preferred embodiments of this invention are described below with reference to the accompanying drawings.

Note that the description below relates to examples in which an information processing device is a microcomputer and a second information processing device is a debugging tool. The configuration in which an information processing device is a microcomputer and a second information processing device is a debugging tool is particularly preferable, but this invention is not limited thereto.

1. Characteristics of this Invention

Figure 3:
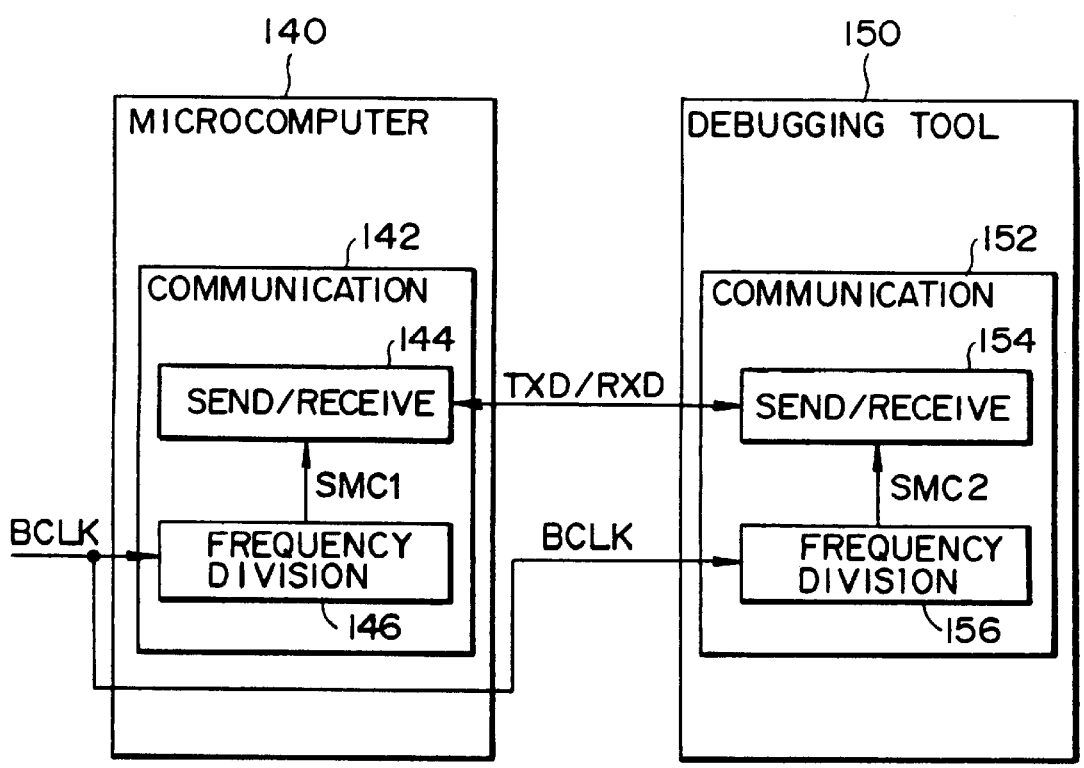
FIG. 3 illustrates the communication method of this embodiment of the invention.

As described with reference to FIG. 1A, the synchronous method causes a problem in that the number of communication lines required therefor increases unnecessarily. In general, the start-stop synchronization illustrated in FIG. 1B also has a problem in that sampling errors in the transferred data tend to increase as the frequency of the clock signal increases, making it difficult to do debugging in an environment in which the microcomputer operates fast. To solve these problems, a microcomputer 140 and a debugging tool 150 of this embodiment of the invention use BCLK in common for generating sampling clock signals, as shown in FIG. 3.

More specifically, the microcomputer 140 (information processing device) comprises a communication section 142. The communication section 142 comprises a send/receive circuit 144 and a frequency (clock) division circuit 146. This frequency division circuit 146 divides the frequency of BCLK (a first clock signal) to generate a sampling clock signal SMC1, shown in FIG. 4A, that is used for sampling the bits of data to be sent or received by start-stop synchronization. The send/receive circuit 144 sends and receives the data on the basis of this SMC1. The microcomputer 140 also supplies BCLK to the debugging tool 150.

The debugging tool 150 (the second information processing device) comprises a communication section 152. The communication section 152 comprises a send/receive circuit 154 and a frequency division circuit 156. This frequency division circuit 156 divides the frequency of the BCLK signal supplied from the microcomputer 140 to generate another sampling clock signal SMC2, shown in FIG. 4B. The send/receive circuit 154 sends and receives data on the basis of that SMC2 signal.

In the thus-configured embodiment, the microcomputer 140 and the debugging tool 150 use the BCLK signal in common for generating the sampling clock signals SMC1 and SMC2, although start-stop synchronization is used. This makes it possible to reduce the ratio at which sampling errors are generated in the transferred data to far less than in the generic start-stop synchronization method shown in FIG. 1B. In addition, although four communication line are necessary for transfer by the synchronous method, as shown in FIG. 1A, two communication lines (or three lines, for full-duplex transfer) are sufficient for this embodiment, as shown in FIG. 3. Therefore, fewer communication lines are necessary between the microcomputer 140 and the debugging tool 150 than as shown in FIG. 1A. As a result, it is possible to reduce the number of terminals (pins) of the microcomputer 140 and the microcomputer 140 can be designed to have a lower cost.

Figure 1A:
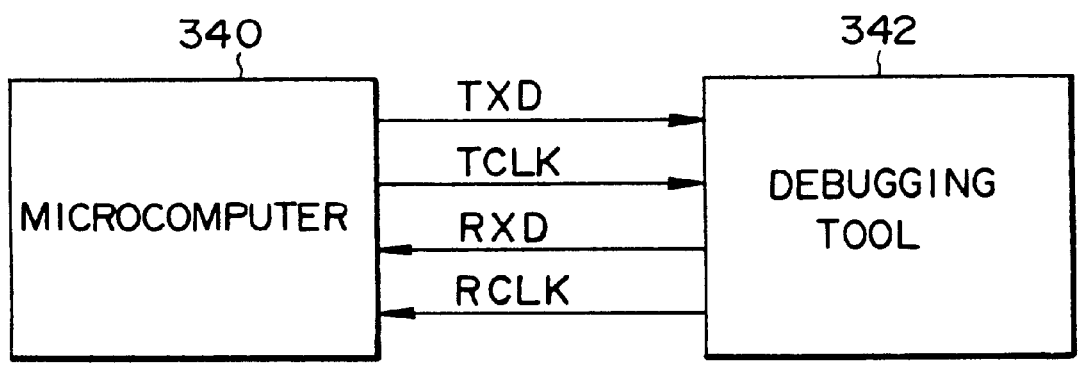
FIGS. 1A and 1B illustrate communication by a synchronous method and by start-stop synchronization.
Figure 1B:
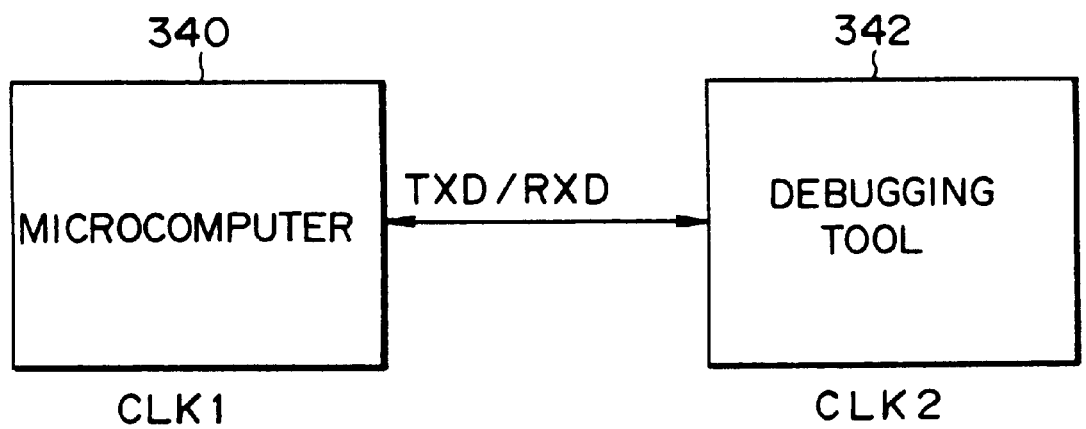

With the configuration of FIG. 1B, the ratio of sampling errors generated in the transferred data increases particularly as the frequency of CLK1 (and CLK2) increases. This means that it is not possible to increase the clock frequency of the microcomputer 340 during debugging, making it impossible to debug the microcomputer 340 in an environment in which it operates at a high speed.

In contrast thereto, the embodiment of FIG. 3 generates the sampling clock signals for both the microcomputer 140 and the debugging tool 150 from BCLK. This means that the generation ratio of sampling errors does not increase by so much, even when the frequency of BCLK is increased. As a result, it is possible to debug the microcomputer 140 in an environment in which it operates at a high speed, so that debugging can be done in an environment that is closer to that of actual operation.

2. Division Ratio Control

Figure 5:
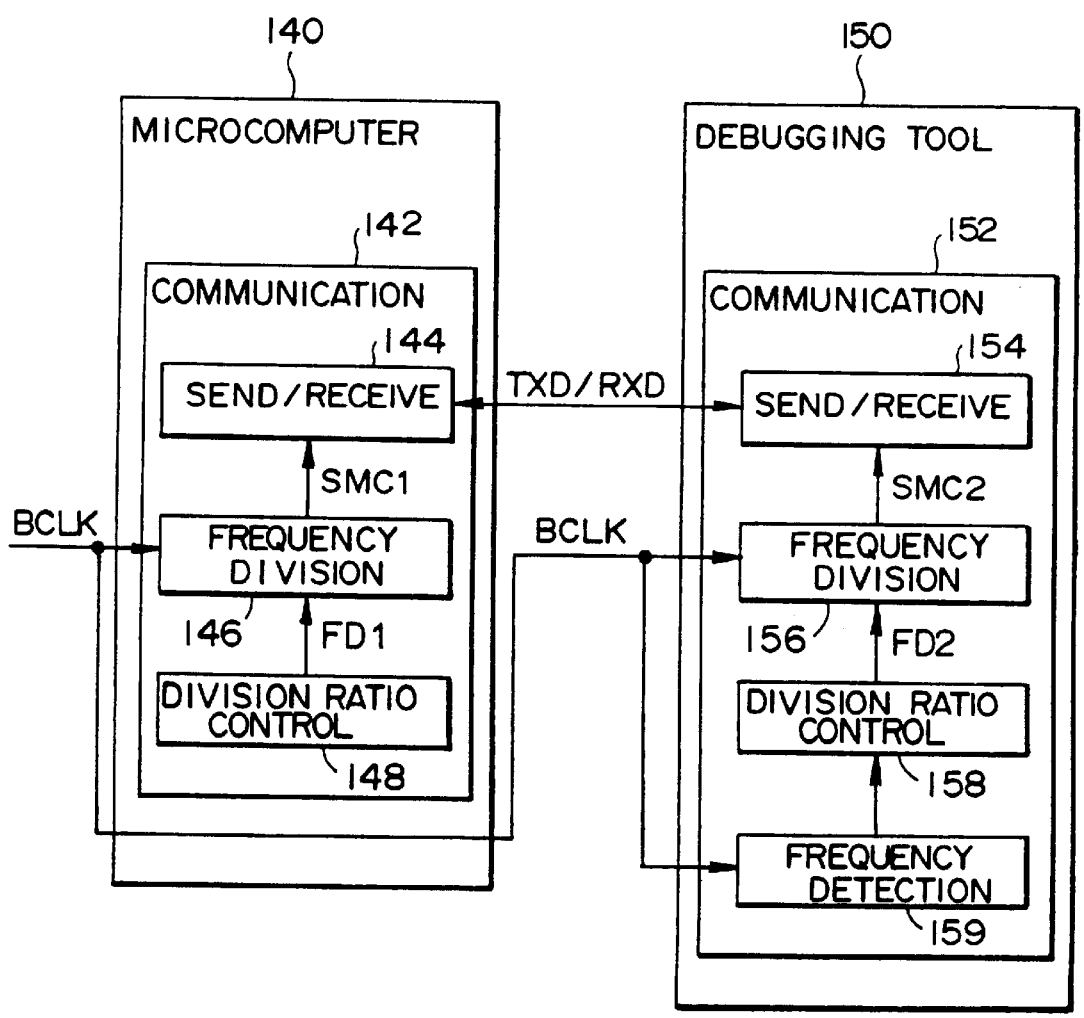
FIG. 5 illustrates a method of controlling the division ratio.

In addition, the communication section 142 of this embodiment comprises a division ratio control section 148 and also the communication section 152 comprises a division ratio control section 158 and a frequency detection circuit 159, as shown in FIG. 5. This enables variable control over a division ratio FD1 used when generating SMC1 and a division ratio FD2 used when generating SMC2. As a result, it is possible to transfer data at the most suitable fast communication speed, even when the frequency of BCLK has changed.

Figure 4A:
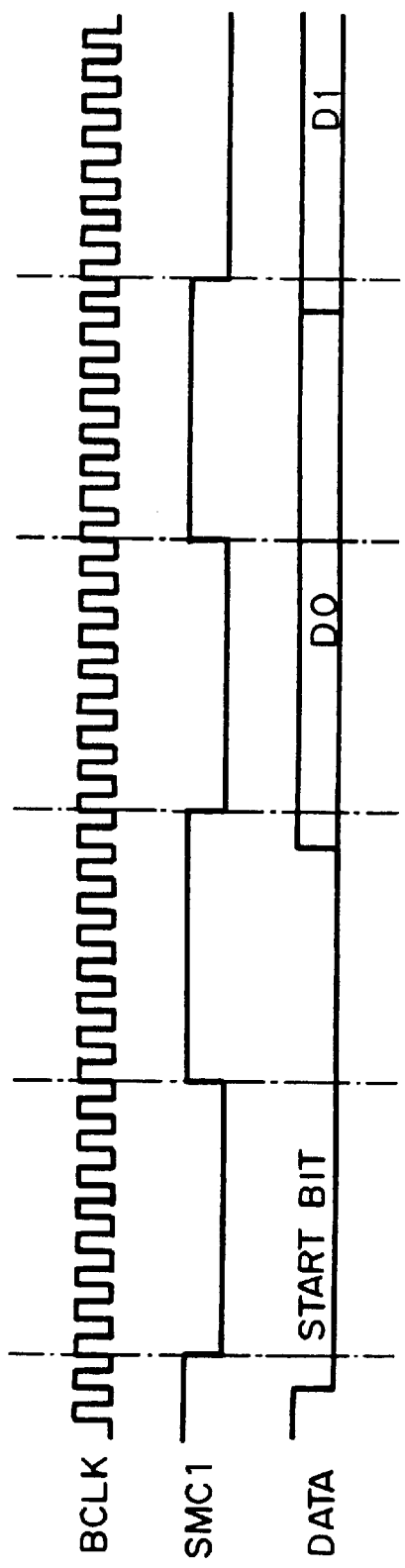
FIGS. 4A and 4B show timing waveforms of a clock signal, a sampling clock signal, and sampling data in accordance with the method of FIG. 3.
Figure 4B:
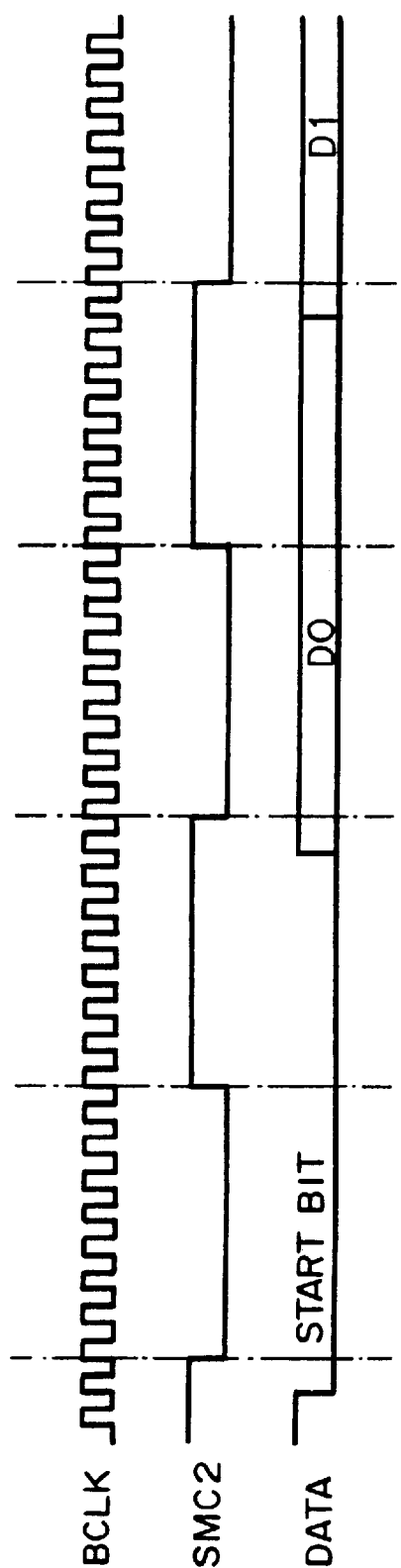

In other words, if the frequency of BCLK has dropped, as shown in FIG. 6A, the division ratios FD1 and FD2 that are shown as 16 in FIGS. 4A and 4B can be modified to 8, by way of example. This means that the sampling clock signals SMC1 and SMC2 are changed from clock signals of a frequency that is the BCLK frequency divided by 16 to clock signals of a frequency that is the BCLK frequency divided by 8. Thus the number of BCLK clock pulses corresponding to one bit of data changes from 16 (16-clock mode) to 8 (8-clock mode).

If the frequency of BCLK drops even further, as shown in 6B, the division ratios FD1 and FD2 that were 8 in FIG. 6A can be modified to 4, by way of example. This means that the sampling clock signals SMC1 and SMC2 are changed from clock signals of a frequency that is the BCLK frequency divided by 8 to clock signals of a frequency that is the BCLK frequency divided by 4. Thus the number of BCLK clock pulses corresponding to one bit of data changes from 8 (8-clock mode) to 4 (4-clock mode).

This adaptation ensures that the data communication speed does not end up falling too low, even if the BCLK frequency does fall. It is therefore possible to transfer data at the most suitable fast communication speed.

A particular feature of the clock frequency of microcomputers is that it often differs depending on the users of the microcomputers. In other words, one user will operate the microcomputer at a clock signal of 60 MHz, whereas another user will operate the same microcomputer at a clock signal of 20 MHz.

With the transfer methods shown in FIGS. 1A and 1B, however, if the clock frequency of the microcomputer changes, the data communication speed also changes. In other words, if the clock frequency falls, the data communication speed also falls. It is therefore no longer possible to transfer data at the maximum communication speed.

In contrast thereto, this embodiment of the invention ensures that, if the clock frequency of the microcomputer is changed as required by the user of the microcomputer, the division ratios FD1 and FD2 also change and thus the number of clock pulses corresponding to one bit of data changes as well. In other words, if the clock frequency falls, the division ratios FD1 and FD2 also become smaller, and thus the number of clock pulses corresponding to one bit of data becomes smaller too. As a result, the communication speed does not end up falling too low, and thus transfer is at the most suitable fast communication speed. In other words, the configuration is such that transfer is at the optimal communication speed, in accordance with users who are using clock signals of a wide range of frequencies.

Figure 7:
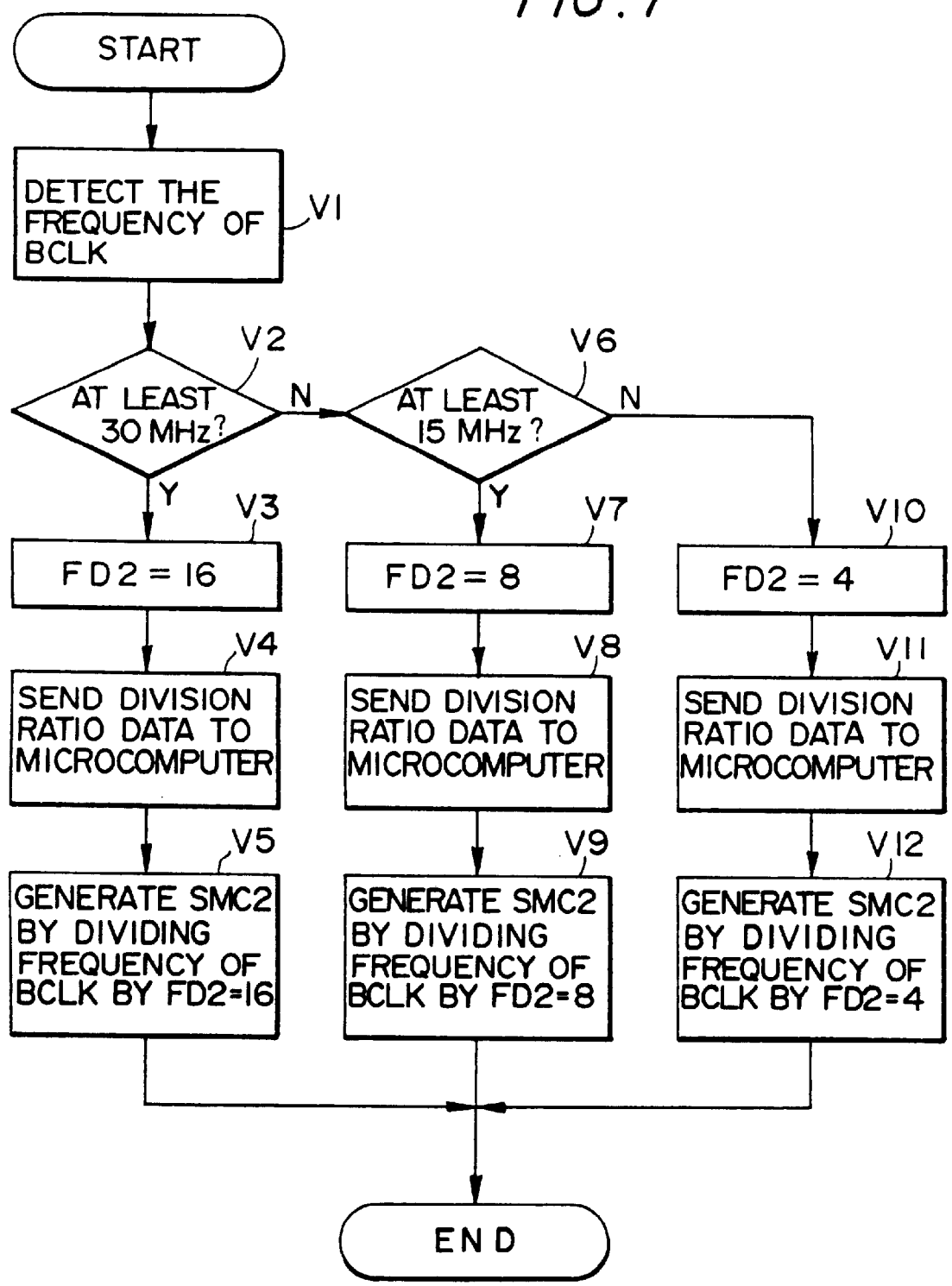
FIG. 7 is a flowchart illustrating the process of setting the division ratio on the debugging tool side.
Figure 8:
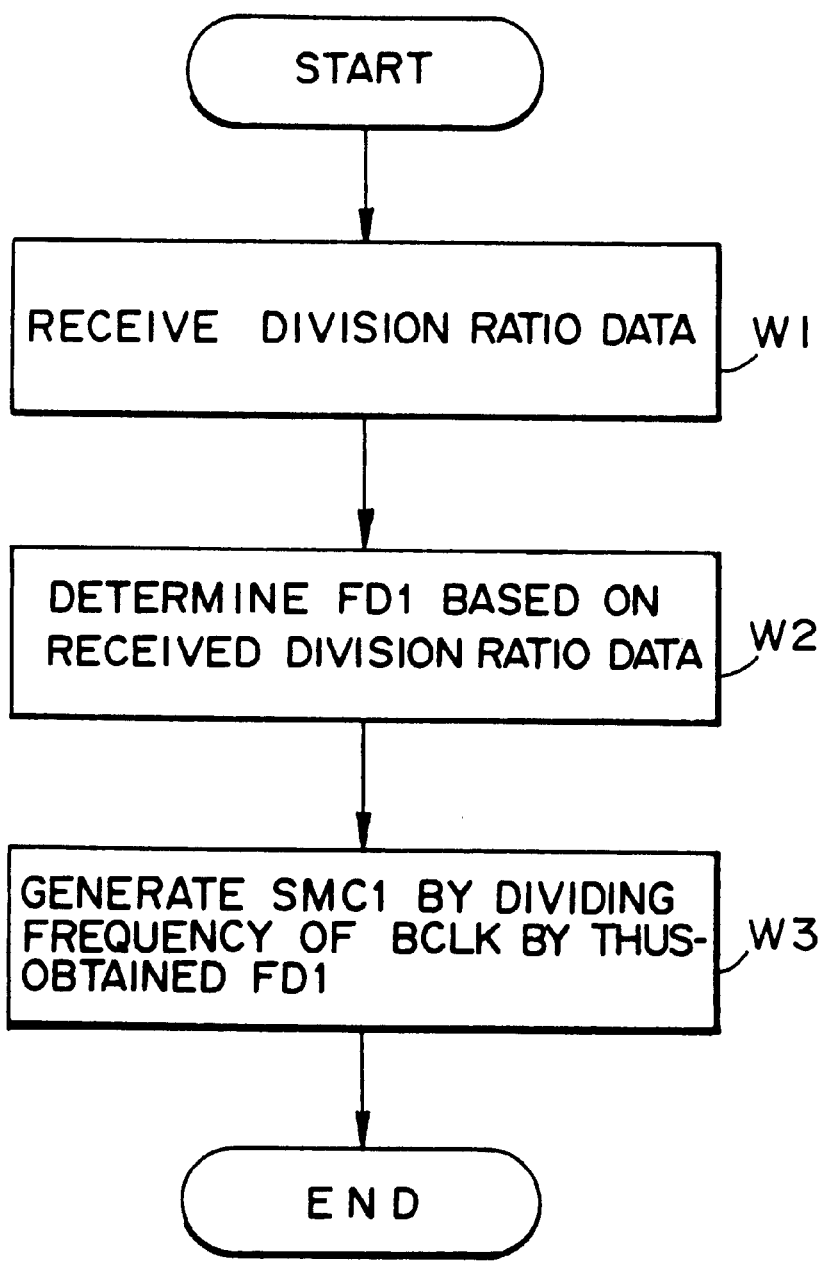
FIG. 8 is a flowchart illustrating the process of setting the division ratio on the microcomputer side.

The description now turns to a more detailed account of the processing performed by the communication sections 142 and 152, using the flowcharts of FIGS. 7 and 8.

As shown in FIG. 7, the frequency detection circuit 159 within the communication section 152 of FIG. 5 first detects the frequency of BCLK supplied from the microcomputer 140 (step V1). It then determines whether or not the frequency of BCLK is at least 30 MHz (step V2), and, if it is at least 30 MHz, the division ratio control section 158 sets the division ratio FD2 to 16 (step V3). Division ratio data indicating that the FD2 is 16 is sent through the send/receive circuit 154 to the microcomputer 140 (step V4). The frequency division circuit 156 then generates SMC2 by dividing BCLK by this FD2=16 (step V5). Subsequently, data is transferred in accordance with this SMC2.

If the frequency of BCLK is less than 30 MHz, a further step determines whether or not it is at least 15 MHZ (step V6). If the frequency is at least 15 MHz, FD2 is set to 8 (step V7), and processing continues in a similar manner to that of steps V4 and V5 (steps V8 and V9). If the frequency of BCLK is less than 15 MHz, FD2 is set to 4 (step V10), and processing continues in a similar manner to that of steps V4 and V5 (steps V11 and V12).

The flowchart of FIG. 8 shows the processing on the microcomputer 140 side. First of all, the division ratio data is received from the debugging tool 150 through the send/receive circuit 144 (step W1). The division ratio control section 148 determines the division ratio FD1 on the basis of the received division ratio data (step W2). The frequency division circuit 146 divides the frequency of BCLK by this FD1 to generate SMC1. Subsequently, data is transferred in accordance with this SMC1.

As described above, this embodiment of the invention adjusts FD1 and FD2 while the microcomputer 140 and the debugging tool 150 are communicating with each other, uses these. division ratios FD1 and FD2 to divide the frequency of BCLK, then samples the transferred data by using the thus-obtained SMC1 and SMC2. This ensures that the data can always be transferred at the most suitable fast communication speed. In addition, this embodiment of the invention makes it possible to reduce the number of terminals of the microcomputer 140 to fewer than that for the synchronous method of FIG. 1A, even though it is it still possible to optimize the communication speed rapidly in this manner, thus enabling a reduction in the cost of the microcomputer 140.

3. Mini Monitor Section

Figure 9A:
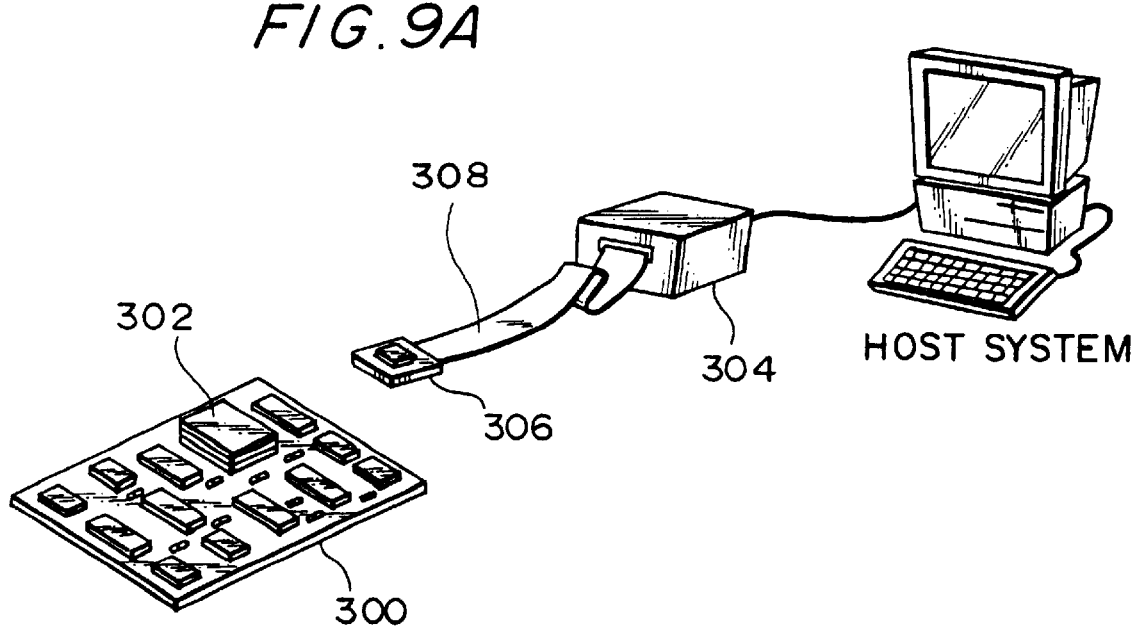
FIG. 9A shows a CPU-switching type of ICE and FIG. 9B shows a type of ICE with an installed monitor program.

In the art, the CPU-switching (swapping) type of ICE shown in FIG. 9A is the most common type of ICE used to support the development of software to run on a target system. With this CPU-switching ICE, a microcomputer 302 is removed from a target system 300 during debugging, and a probe 306 of a debugging tool 304 is connected thereto instead. This debugging tool 304 emulates the operation of the removed microcomputer 302. The debugging tool 304 can also perform the various processes necessary for debugging.

However, this CPU-switching ICE has disadvantages in that there are a large number of pins on the probe 306 and also a large number of lines 308 of the probe 306. It is therefore difficult to emulate the operation of the microcomputer 302 at high frequencies (the limit is at approximately 33 MHz, by way of example). It is also difficult to design the target system 300. Furthermore, the operating environment of the target system 300 (signal timings and load conditions) changes between the situation when the microcomputer 302 is installed and is operating as designed and the situation in debugging mode when the debugging tool 304 is emulating the operation of the microcomputer 302. This CPU-switching ICE has another problem in that, if a different microcomputer is used, such as a modified version thereof, it is necessary to use a debugging tool of a different design and a probe in which the numbers and positions of the pins are different.

Figure 9B:
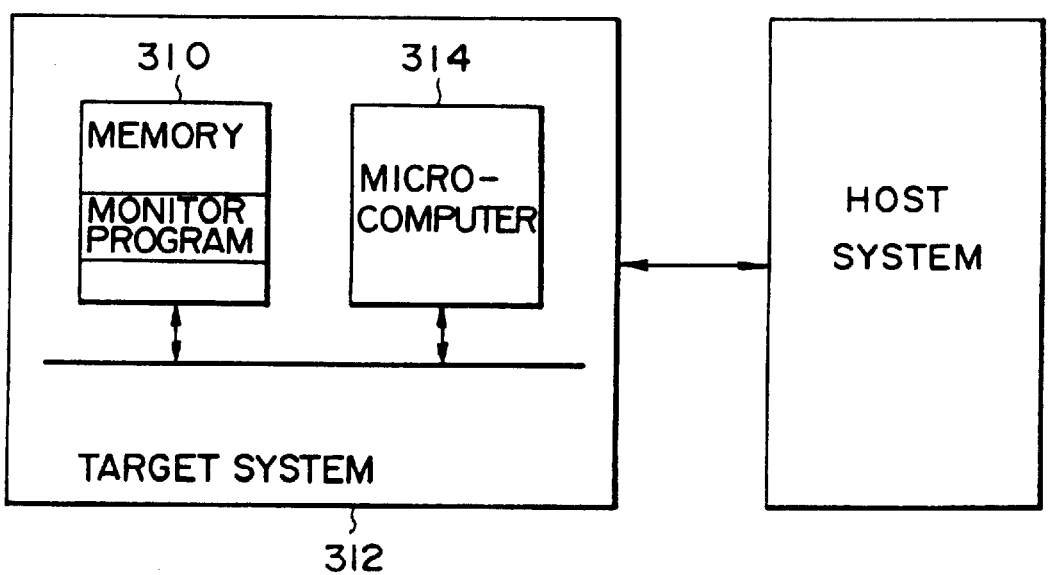

A known method of solving these disadvantages of this CPU-switching ICE is a type of ICE in which a monitor program 310 is installed in a target system 312, as shown in FIG. 9B. However, with this type of ICE with an installed monitor program, it has been necessary up until now to include functions for executing all of the debugging commands (program load, GO, step execution, memory read/write, internal register read/write, and breakpoint setting/release) within the monitor program 310. This means that the instruction code size of the monitor program 310 is extremely large (for example, 30 to 50 kilobytes). This means that the memory region that can be freely utilized by the user is reduced and also the differences in system between debugging and non-debugging operation cause problems. One method of solving the problem of FIG. 1B is a method called on-chip debugging, in which a monitor program is loaded onto the chip, but this method causes problems in that if a monitor program of a large instruction code size is provided on the chip, the size of the chip itself will increase.

In order to solve this problem, this embodiment of the invention employs a method wherein the monitor section is divided into a mini monitor section and a main monitor section.

Figure 10:
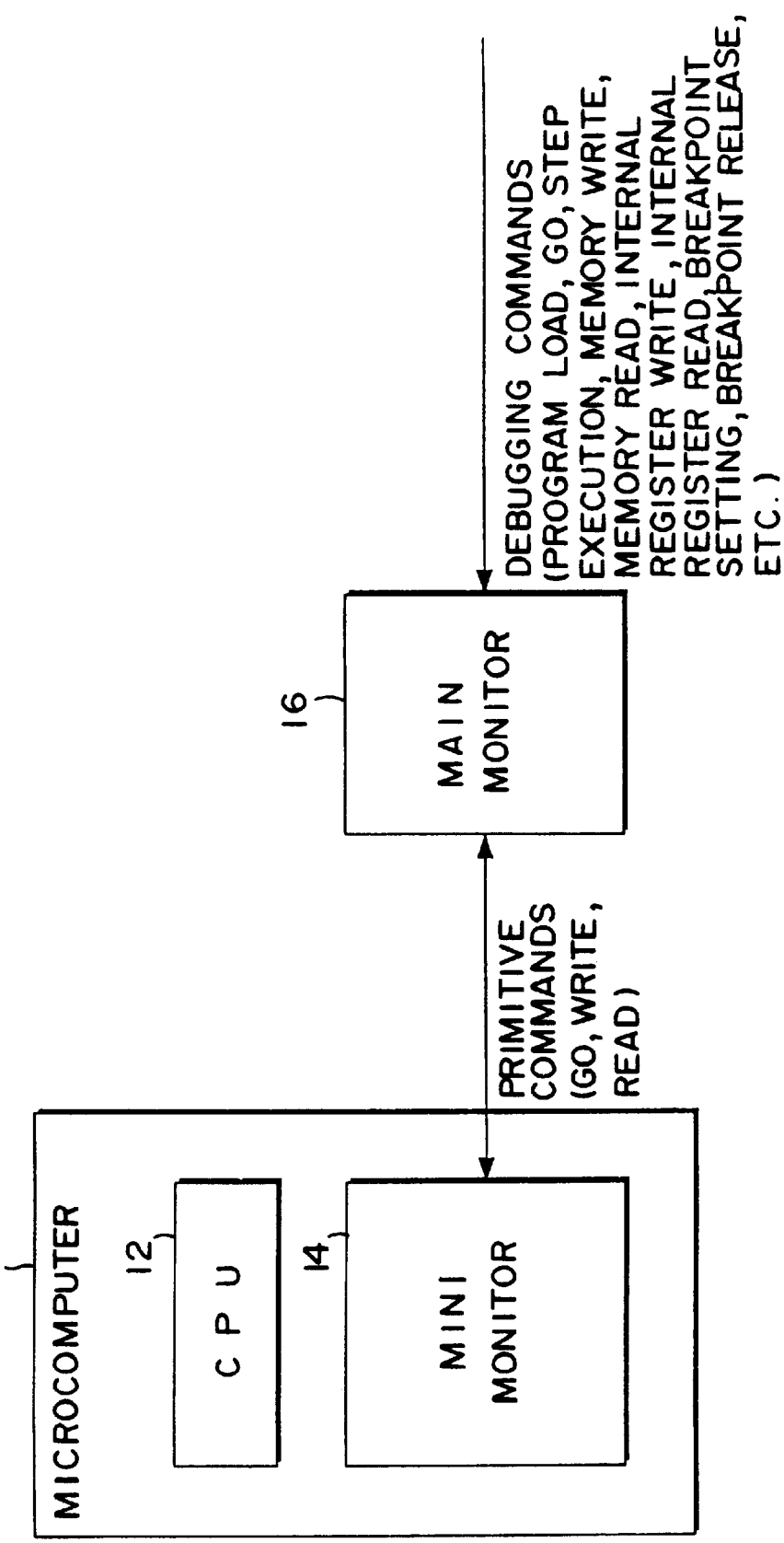
FIG. 10 illustrates a method of providing a mini monitor section.

In other words, a microcomputer 10 of this embodiment comprises a central processing unit (CPU) 12 and a mini monitor section (first monitor means) 14, as shown in FIG. 10. In addition, a main monitor section (second monitor means) 16 is provided outside the microcomputer 10. In this case, the main monitor section 16 performs processing to convert (decompose) debugging commands issued by a host system, for example, into primitive commands. In addition, the mini monitor section 14 transfers data to and from the main monitor section 16. The mini monitor section 14 determines the primitive commands to be executed, based on the data received from the main monitor section 16, and performs processing for executing those primitive commands.

In this case, commands such as program load, GO, step execution, memory write, memory read, internal register write, internal register read, breakpoint setting, or breakpoint release could be considered as the debugging commands that are the object of the conversion processing performed by the main monitor section 16. The main monitor section 16 executes processing to convert a wide range of complicated debugging commands into simple primitive commands such as GO, write (a write to a given address on the memory map, when in debugging mode), and read (a read from a given address on the memory map). Such a configuration makes it possible to greatly reduce the instruction code size of the mini monitor program run by the mini monitor section 14. This enables the implementation of an on-chip debugging function for the microcomputer 10.

In other words, the monitor program 310 of the type of ICE shown in FIG. 9B has routines for processing all of the debugging commands, such as program load, GO, and step execution. The instruction code size of the monitor program 310 is therefore extremely large (for example, 30 to 50 kilobytes), making it difficult to incorporate the monitor program 310 into a microcomputer 314 in practice.

In contrast thereto, the mini monitor program run by the mini monitor section 14 of this embodiment only has routines for processing simple primitive commands such as GO, write, and read, making the instruction code size thereof extremely small (256 bytes, for example). This means that the mini monitor program can be installed in the microcomputer 10, enabling the implementation of an on-chip debugging function. It also makes it possible to restrain any reduction of the memory region that can be used freely by the user, to a minimum or even zero.

4. Detailed Structural Example

Figure 11:
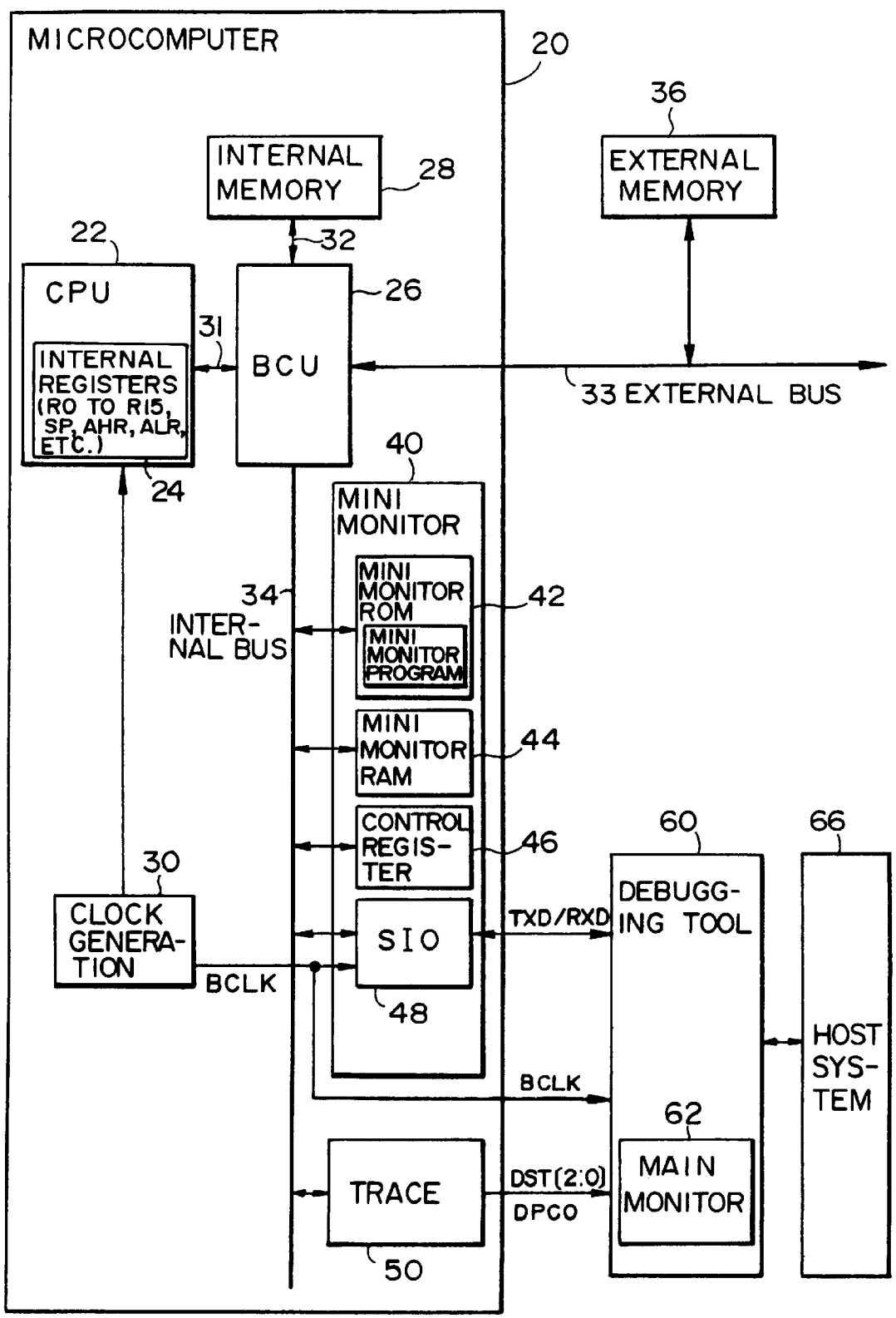
FIG. 11 is a functional block diagram of an example of the structure of the microcomputer and debugging system of this embodiment.

A detailed example of the structure of the microcomputer and debugging system of this embodiment is shown in FIG. 11. As shown in FIG. 11, a microcomputer 20 comprises a CPU 22, a bus control unit (BCU) 26, internal memory (internal ROM and internal RAM other than a mini monitor ROM 42 and a mini monitor RAM 44) 28, a clock generation section 30, a mini monitor section 40 (first monitor means), and a trace section 50.

In this case, the CPU 22 is designed to execute various instructions and comprises internal registers 24. The internal registers 24 comprise general-purpose registers R0 to R15 as well as a stack pointer (SP) register, a higher arithmetic register (AHR) for storing sum-of-products result data, and a lower arithmetic register (ALR) for storing sum-of-products result data, which are special registers.

The BCU 26 is designed to control buses. It controls a bus 31 of a Harvard architecture connected to the CPU 22, a bus 32 connected to internal memory 28, an external bus 33 connected to external memory 36, and an internal bus 34 connected to components such as the mini monitor section 40 and the trace section 50.

The clock generation section 30 generates the various clock signals used within the microcomputer 20. Note that a BCLK is also supplied from the clock generation section 30 to an external debugging tool 60.

The mini monitor section 40 comprises the mini monitor ROM 42, the mini monitor RAM 44, a control register 46, and an SIO (Serial Input/Output) 48.

In this case, a mini monitor program is stored in the mini monitor ROM 42. The mini monitor program in this embodiment of the invention executes only simple primitive commands such as GO, read, and write. Thus the memory capacity of the mini monitor ROM 42 can be restrained to 256 bytes, by way of example, and thus the microcomputer 20 can be made more compact while still retaining an on-chip debugging function.

The contents of the internal registers 24 of the CPU 22 are saved to the mini monitor RAM 44 at a transition to debugging mode (when a break occurs in a user program).

This ensures that the execution of the user program can restart correctly after debugging mode ends. Reading and other manipulations of the contents of these internal registers can be implemented by primitive read and other commands within the mini monitor program.

The control register 46 is a register for controlling the various debugging processes, and contains a step execution enable bit, a break enable bit, a break address bit, and a trace enable bit, etc. The CPU 22 operating in accordance with the mini monitor program can implement the various debugging processes by writing data to the bits of the control register 46 and reading data from those bits.

The SIO 48 is a circuit for transferring data to and from the debugging tool 60 that is provided outside the microcomputer 20. The SIO 48 and the debugging tool 60 are connected by a TXD/RXD line (data transfer line).

The trace section 50 is designed to implement a real-time trace function. The trace section 50 and the debugging tool 60 are connected by four lines: a 3-bit DST [2:0] indicating the state of instruction execution at the CPU 22 and a DPCO indicating the value in the program counter (PC) for the branch destination.

The debugging tool 60 comprises a main monitor section 62 and is connected to a host system 66 implemented by a personal computer or the like. If the host system 66 issues debugging commands such as program load and step execution in answer to the user's actions, the main monitor section 62 converts (decomposes) those debugging commands into primitive commands. If the main monitor section 62 sends data indicating the execution of primitive commands to the mini monitor section 40, the mini monitor section 40 executes the indicated primitive commands.

An example of the memory map in debugging mode is shown in FIG. 12. The addresses of the control register 46, the mini monitor RAM 44, and the mini monitor ROM 42 of FIG. 11 are allocated to the memory map when in debugging mode, as shown at D1, D2, and D3 in FIG. 12.

5. Conversion to Primitive Commands

The conversion of various debugging commands into primitive commands is shown schematically in FIGS. 13A to 13D.

Assume, by way of example, that a debugging command is issued to load 12-byte program (ADD . . . , SUB . . . , AND . . . , OR . . . , XOR . . . , LD.W . . . ) to an address 80010h, as shown in FIG. 13A. In this case, this program load command is converted into three primitive write commands: write (80010h, ADD . . . , SUB . . . ), write (80014h, AND . . . , OR . . . ), and write (80018h, XOR . . . , LD.W . . . ). In other words, the mini monitor program implements a program load command by executing these three primitive write commands.

Assume that a debugging command that is a step execution command is issued, as shown in FIG. 13B. When this happens, this step execution command is converted into a write command to the step execution enable bit of the control register 46 of FIG. 11 (a write command to the address at D1 in FIG. 12) and a GO command. In other words, the mini monitor program implements the step execution command by executing these primitive write and GO commands.

Assume that a debugging command that is an internal register read command is issued, as shown in FIG. 13C. When this happens, this internal register read command is converted into read command from the mini monitor RAM (the save destination of the contents of the internal registers) on the memory map (a read command from the address at D2 in FIG. 12). In other words, the mini monitor program implements an internal register read command by executing this primitive read command. An internal register write command, a memory read command, and a memory write command are all implemented in a similar fashion.

Finally, assume that a debugging command that is a breakpoint setting command is issued, as shown in FIG. 13D. When this happens, this breakpoint setting command is converted into write commands to the break enable bit and break address bit of the control register 46. In other words, the mini monitor program implements a breakpoint setting command by executing these primitive write commands.

In the thus-configured embodiment, complicated, diverse debugging commands can be converted into simple, primitive read, write, and GO commands. In addition, the instruction code size of the mini monitor program is extremely small, because only these primitive read, write, and GO commands need be executed. As a result, the memory capacity of the mini monitor ROM 42 can be made small and an on-chip debugging function can be implemented within a compact hardware structure.

6. Structural Example of SIO

An example of the structure of the SIO 48 is shown in FIG. 14. The SIO 48 comprises a send/receive buffer 70, a shift register 76, a send/receive switching section 78, a clock control section 80, and a control register 84.

In this case, the SIO 48 is equivalent to the communication section 142 of FIG. 5. Similarly, the send/receive buffer 70, the shift register 76, and the send/receive switching section 78 are equivalent to the send/receive circuit 144. A frequency division circuit 82 comprised within the clock control section 80 is equivalent to the frequency division circuit 146. The control resister 84 is equivalent to the division ratio control section 148 of FIG. 5.

The send/receive buffer 70 is designed to hold send data and receive data temporarily, and comprises a send buffer 72 and a receive buffer 74. The shift register 76 has the functions of converting send data from the send buffer 72 from parallel data into serial data, then outputting it to the send/receive switching section 78. It also has the functions of converting receive data from the send/receive switching section 78 from serial data into parallel data, then outputting it to the receive buffer 74. The send/receive switching section 78 is designed to switch between sending and receiving data. This enables half-duplex data transfer, using TXD/RXD.

The clock control section 80 uses the incorporated frequency division circuit 82 to divide BCLK, and outputs a sampling clock signal SMC1 obtained by this division to the shift register 76. The operation of the shift register 76 is based on this SMC1. The BCLK signal is also supplied to the debugging tool 60. This ensures that BCLK is used in common by the microcomputer 20 and the debugging tool 60.

The division ratio in the frequency division circuit 82 is set by the control register 84. In other words, the mini monitor program run by the CPU 22 can set the division ratio of the frequency division circuit 82 by writing a given division ratio to the control register 84. Note that the address of the control register 84 is allocated to the D1 position of FIG. 12, in a similar manner to that of the control register 46 of FIG. 11.

7. Structural Example of Debugging Tool

Figure 15:
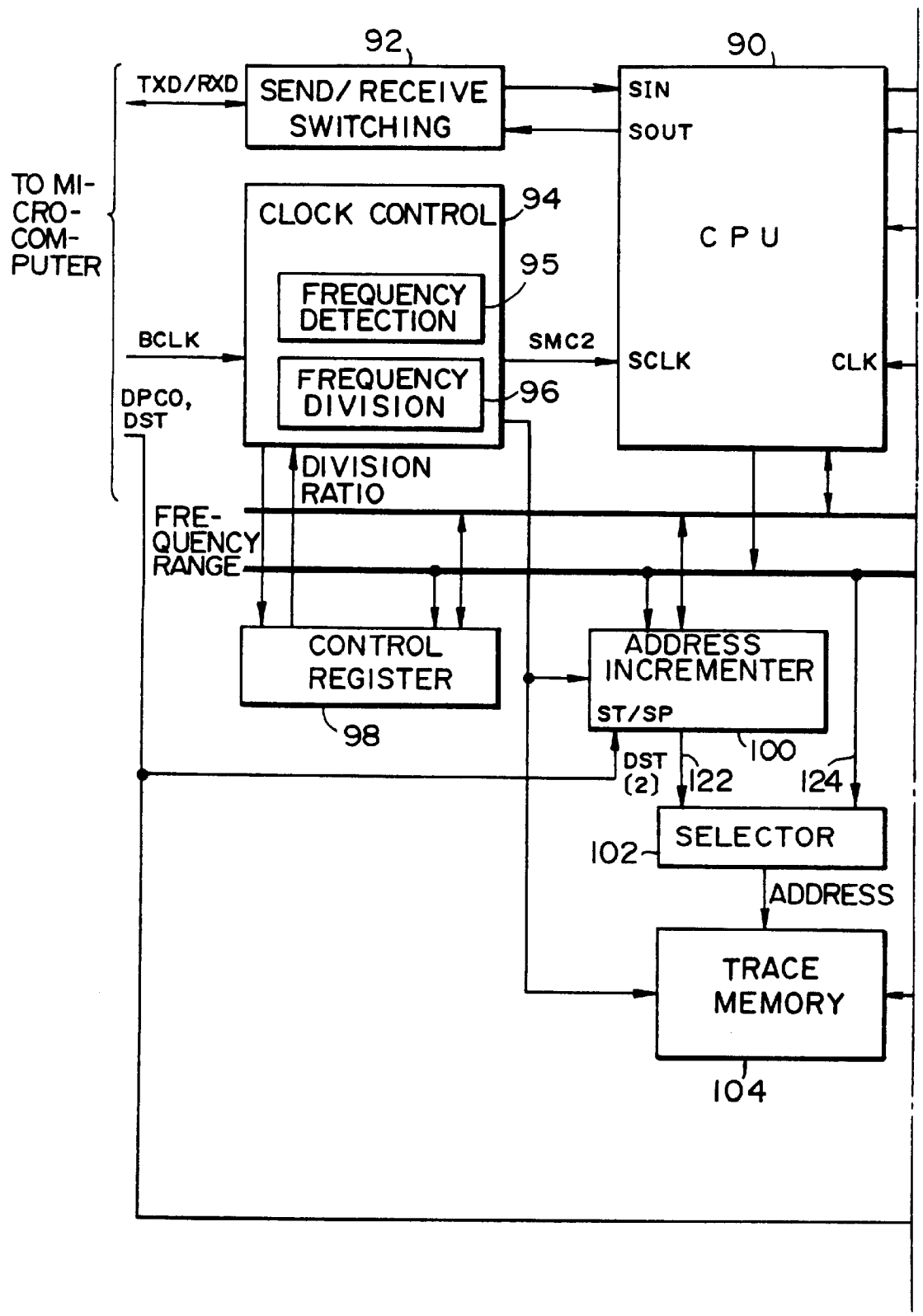
FIG. 15 is a functional block diagram of an example of the structure of the debugging tool.

An example of the structure of the debugging tool 60 is shown in FIG. 15.

A CPU 90 runs a program stored in a ROM 108, providing overall control of the debugging tool 60. A send/receive switching section 92 is designed to switch between sending and receiving data. The CPU 90 and the send/receive switching section 92 are equivalent to the send/receive circuit 154 of FIGS. 3 and 5.

A clock control section 94 controls a clock signal supplied to an SCLK terminal of the CPU 90, an address incrementer 100, and a trace memory 104. The BCLK signal from the microcomputer 20 (the SIO 48) is input to this clock control section 94.

The clock control section 94 comprises a frequency detection circuit 95 (equivalent to the frequency detection circuit 159 of FIG. 5) and a frequency division circuit 96 (equivalent to the frequency division circuit 156 of FIGS. 3 and 5). The frequency detection circuit 95 detects the frequency range to which BCLK belongs, then outputs the result to a control register 98 (equivalent to the division ratio control section 158 of FIG. 5). In addition, the division ratio of the frequency division circuit 96 is controlled by the control register 98. In other words, a main monitor program run by the CPU 90 (stored in a main monitor ROM 110) reads out the frequency range of BCLK from the control register 98. The main monitor program determines the optimal division ratio corresponding to this frequency range, and writes that division ratio to the control register 98. The frequency division circuit 96 divides BCLK by this division ratio to generate SMC2, and outputs it to the SCLK terminal of the CPU 90.

The address incrementer 100 is designed to increment the address in trace memory. A selector 102 selects either of a line 122 (for the address output by the address incrementer 100) or a line 124 (for an address from an address bus 120), to output an address to an address terminal of the trace memory 104. Another selector 106 selects either of a line 126 (for DST [2:0] and DPCO, which are output by the trace section 50 of FIG. 11) or a line 128 (for a data bus 118), to output data to a data terminal of the trace memory 104 or take in data from that data terminal.

The ROM 108 comprises the main monitor ROM 110 (equivalent to the main monitor section 62 of FIG. 11), and a main monitor program is stored in the main monitor ROM 110. This main monitor program performs processing for converting debugging commands into primitive commands, as described previously with respect to FIGS. 13A to 13D. A RAM 112 acts as a work area for the CPU An RS-232C interface 114 and a parallel interface 116 function as interfaces to the host system 66 of FIG. 11, and debugging commands from the host system 66 are input to the CPU 90 through these interfaces. A clock generation section 18 generates the clock signal that activates the CPU 90.

8. Use of BCLK as Trace Data Sampling Clock Signal

In this embodiment of the invention, the BCLK signal (first clock signal) is used as a clock signal for sampling trace data, after a transition from a debugging mode to a user program execution mode. First of all, the description below concerns real-time trace processing.

In this embodiment, a 3-bit DST [2:0] indicating the state of instruction execution at the CPU 22 of FIG. 11 and a DPCO indicating the program counter (PC) of the branch destination are stored in the trace memory 104. Trace data is created from the data stored in the trace memory 104 and the source code of a user program. This configuration makes it possible to implement a real-time trace function, while reducing the number of lines connecting the microcomputer 20 and the debugging tool 60.

Figure 16A:
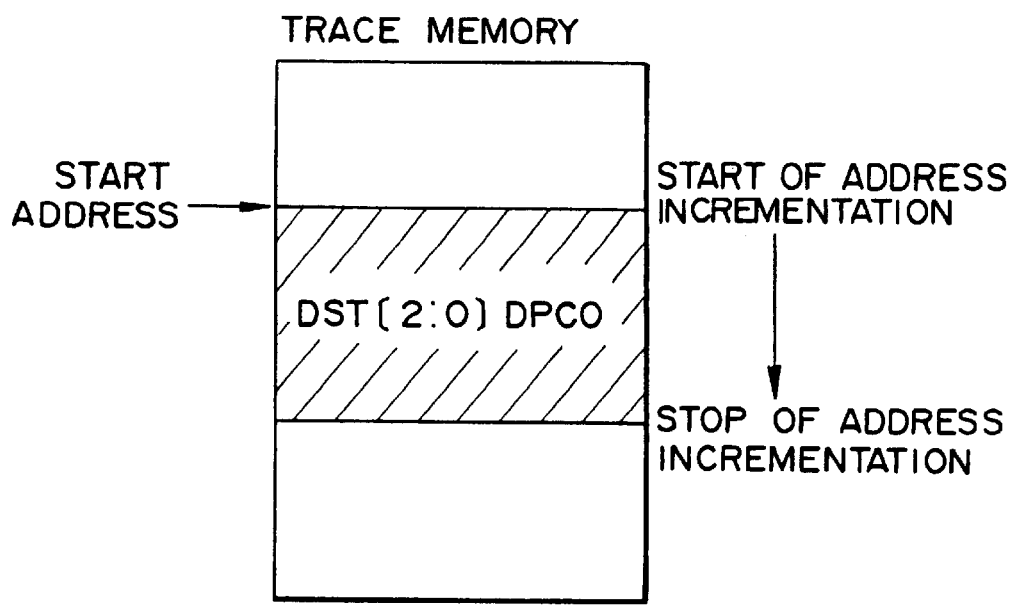
FIGS. 16A and 16B illustrate real-time trace processing.
Figure 16B:
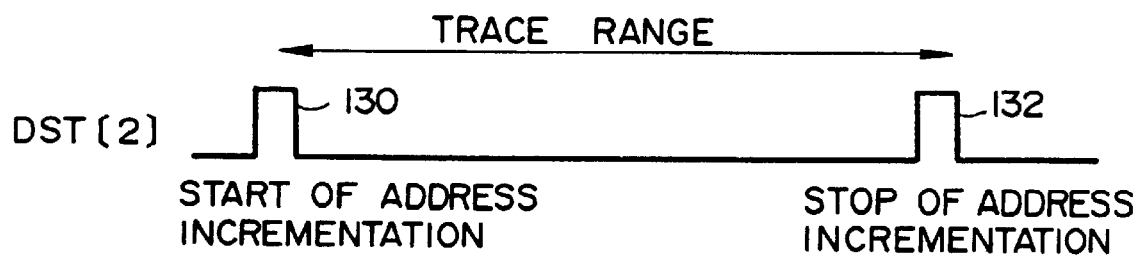

In user program execution mode, the line 122 is selected and the output of the address incrementer 100 is input to the address terminal of the trace memory 104 through the selector 102. In addition, the line 126 is selected and DST [2:0] and DPCO are input to the data terminal of the trace memory 104 through the selector 106. In this case, the address incrementer 100 is initially set by the CPU 90 to the start address, using the data bus 118 and the address bus 120, as shown in FIG. 16A. A line for DST [2], specifying the trace range, is also connected to an ST/SP (start/stop) terminal of the address incrementer 100. When a first pulse 130 is input to the DST [2] line, the address incrementer 100 starts incrementing the address, as shown in FIG. 16B. When a second pulse 132 is input to the DST [2] line, the address incrementer 100 stops incrementing the address and the trace operation halts. In this manner, data (DST [2:0] and DPCO) within the desired trace range can be stored in the trace memory 104.

When operation shifts from user program execution mode to debugging mode, on the other hand, the line 124 is selected and an address from the address bus 120 is input to the address terminal of the trace memory 104 through the selector 102. The line 128 is also selected and data is output from the trace memory 104 over the data bus 118, through the selector 106. This makes it possible to read out the data (DST [2:0] and DPCO) stored in the trace memory 104 to the CPU 90 (main monitor program) when in debugging mode. It is possible to create trace data, based on the read-out data and the source code of a user program.

Figure 17A:
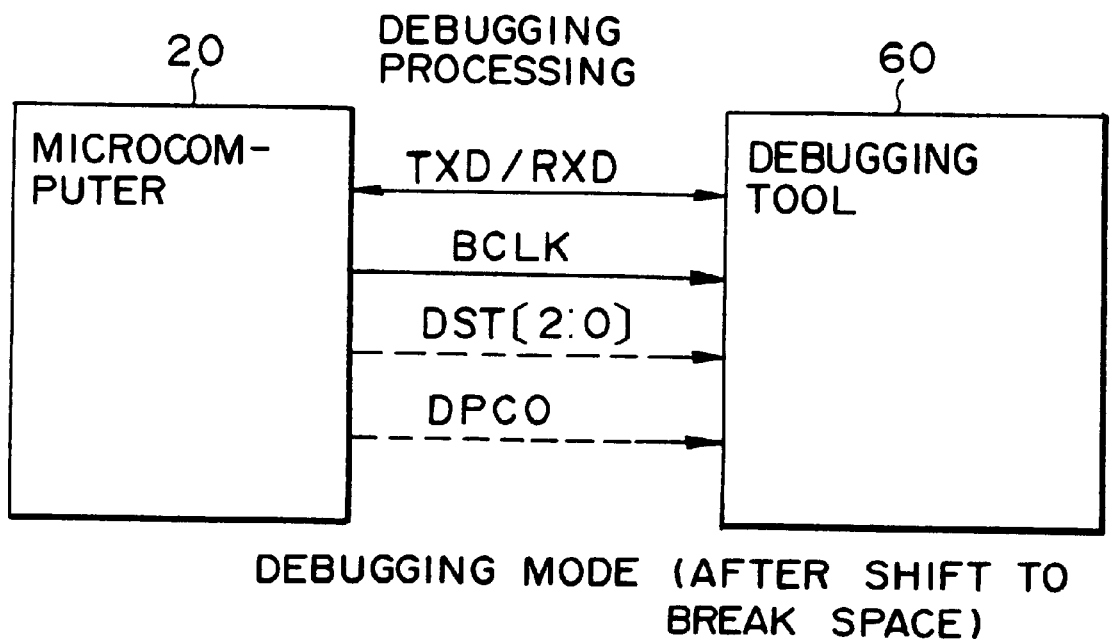
FIGS. 17A and 17B illustrate a method of utilizing BCLK as a clock signal for trace data sampling when in user program execution mode.

Debugging is done in debugging mode, after shifting to a break space, as shown in FIG. 17A. In other words, in debugging mode the user performs debugging operations such as loading a program into a given memory region by the program load command, setting breakpoints by the breakpoint setting command, and reading the contents of the internal registers. In this case, the TXD/RXD line is used to transfer debugging data and the actual debugging processing is performed by the mini monitor section 40 and other components within the microcomputer 20. In this embodiment of the invention, sampling errors are prevented from occurring in the transferred data by having the microcomputer 20 supply the BCLK signal to the debugging tool 60, as previously described.

Note that the operation can be shifted to debugging mode (the break space) by a forced break by inputting a signal to a forced break terminal of the microcomputer 20 or by a software break by setting a breakpoint in the user program.

Figure 17B:
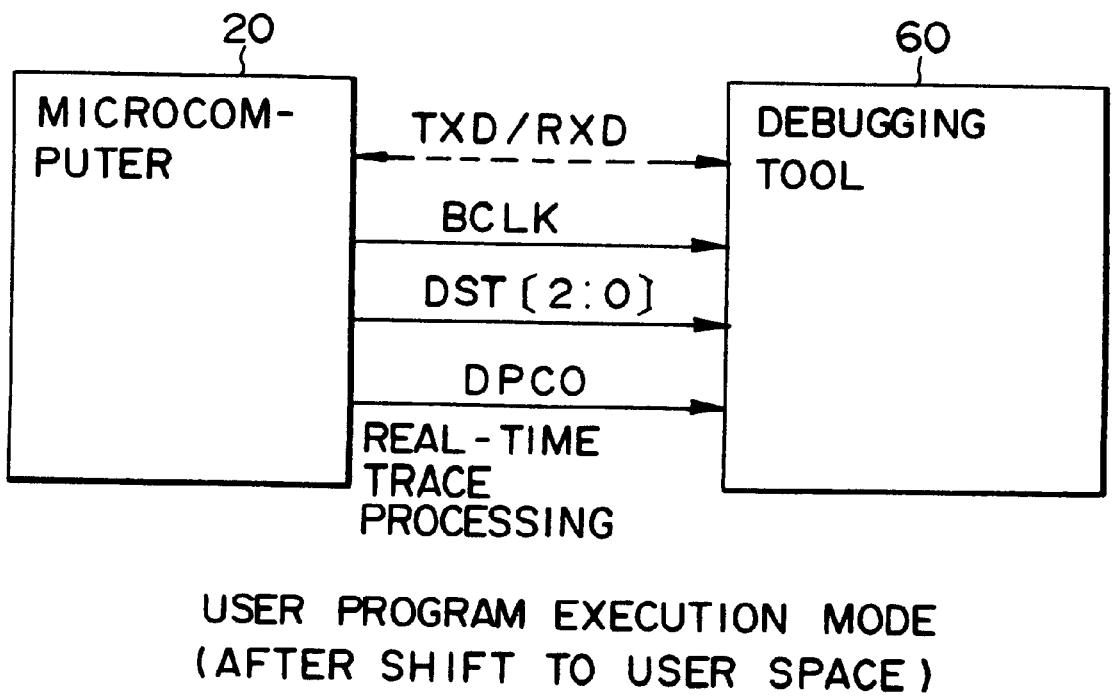

On the other hand, the real-time trace processing of FIGS. 16A and 16B can be done in user program execution mode after shifting to the user space, as shown in FIG. 17B. Since no debugging data is transferred in such a case, the TXD/RXD and BCLK lines would not normally be used in user program execution mode.

In this embodiment of the invention, BCLK can be utilized as a clock signal for sampling the trace data DST [2:0] and DPCO when in user program execution mode. Such a configuration makes it unnecessary to provide a new communication line as a clock signal line for trace data sampling. This makes it possible to further reduce the number of terminals of the microcomputer 20, enabling a reduction in the cost of the microcomputer 20.

9. Electronic Equipment

The description now turns to electronic equipment comprising the microcomputer (information processing device) of this invention.

Figure 18A:
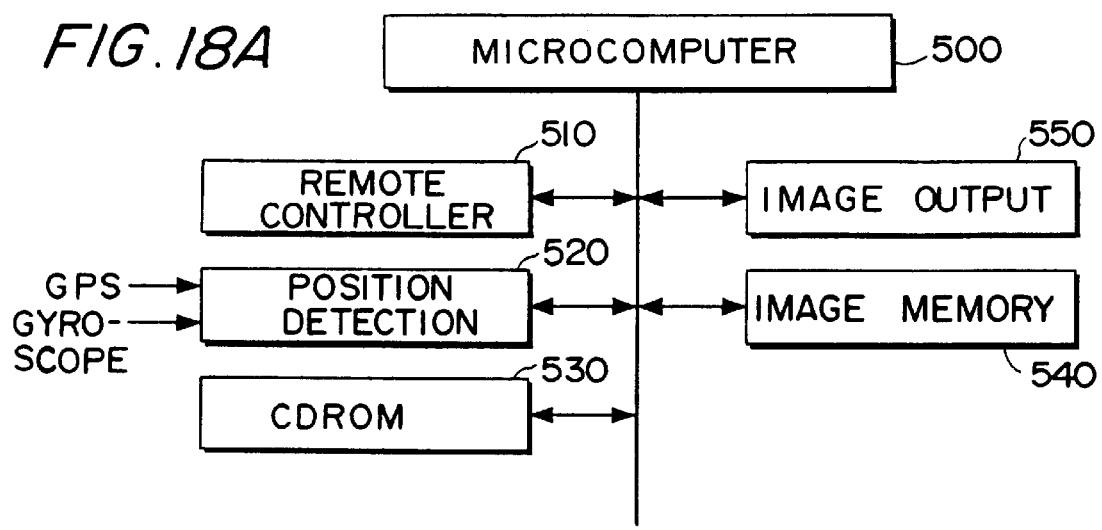
FIGS. 18A to 18C are internal block diagrams of various items of electronic equipment.

An internal block diagram of a car navigation system that is one example of such electronic equipment is shown in FIG. 18A and an external view thereof is shown in FIG. 19A. A remote controller 510 is used to operate this car navigation system and the position of the vehicle is detected by a position detection section 520 on the basis of information from GPS or gyroscope. Maps and other information are stored in a CD-ROM 530 (information storage medium). An image memory 540 functions as a work area during image processing, and the thus generated images are displayed to the driver by an image output section 550. A microcomputer 500 receives data from data input sources such as the remote controller 510, the position detection section 520, and the CD-ROM 530, performs various operations thereon, then uses an output device such as the image output section 550 to output the data after the processing.

Figure 18B:
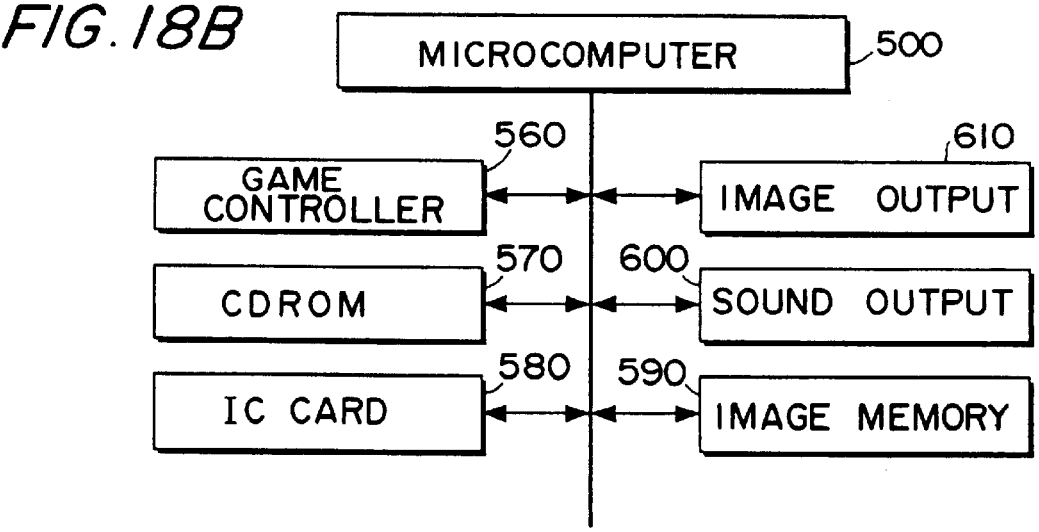

An internal block diagram of a game machine that is another example of such electronic equipment is shown in FIG. 18B and an external view thereof is shown in FIG. 19B. Using an image memory 590 as a work area, this game machine generates game images and sounds based on the player's operating information from a game controller 560, a game program from a CD-ROM 570, and player information from an IC card 580, and outputs them by using an image output section 610 and a sound output section 600.

Figure 18C:
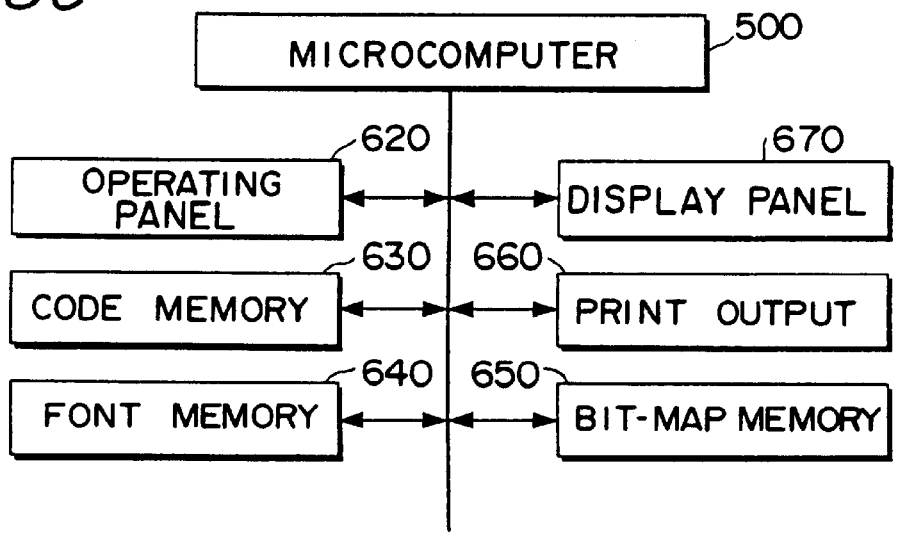

An internal block diagram of a printer that is a further example of such electronic equipment is shown in FIG. 18C and an external view thereof is shown in FIG. 19C. Using a bit map memory 650 as a work area, this printer creates print images based on operating information from an operating panel 620 and character information from a code memory 630 and a font memory 640, and outputs them by using a print output section 660. A display panel 670 is used for conveying the current state and mode of the printer to the user.

The microcomputer or debugging system in accordance with this invention makes it possible to simplify the development and reduce the development time of user programs that cause the operation of the items of electronic equipment shown in FIGS. 18A to 19C. Since it also makes it possible to debug user programs in an environment that is the same as that in which the microcomputer operates, the reliability of this electronic equipment is also increased. The hardware of the microcomputer installed into this electronic equipment can be made more compact and less expensive, leading to a reduction of the cost of the electronic equipment itself. Since the instruction code size of the mini monitor program is also small, the memory area for storing user programs and data can be completely unused thereby.

Note that the electronic equipment to which the microcomputer of this invention can be applied is not limited to those described in the above embodiments, and thus it could be any of a portable telephone (cellular phone), a PHS, a pager, audio equipment, an electronic notebook, an electronic tabletop calculator, a POS terminal, a device provided with a touch panel, a projector, a dedicated wordprocessor, a personal computer, a television set, or a view-finder or direct monitor type of video tape recorder, by way of example.

Note also that this invention is not limited to the embodiments described herein, and various modifications can be conceived within the scope of the invention.

For example, the communication lines connecting the information processing device and the second information processing device could be send-only or receive-only. Similarly, transfer could be half duplex or full duplex.

The method of controlling the division ratios is also not limited to that described with reference to these embodiments, and it can be modified in many various ways.

The configuration of the microcomputer is also not limited to that described with reference to these embodiments, and it can be modified in many various ways.

What is claimed is:

1. An information processing device comprising a first communications means for transferring data by start-stop synchronization to and from a second communication means comprised within a second external information processing device, wherein said first communication means comprises:

a first frequency division circuit for dividing the frequency of a first clock signal to generate a first sampling clock signal for sampling each bit of data transferred by start-stop synchronization; and a circuit for performing at least one of data reception and transmission, based on the first sampling clock signal; and wherein said first communication means supplies said first clock signal to said second information processing device as a signal that enables a second frequency division circuit comprised within said second communication means to generate a second-sampling clock signal.

2. The information processing device as defined in claim 1, wherein said first communication means comprises a first division ratio control means for controlling the division ratio in said first frequency division circuit; and wherein a second division ratio control means comprised within said second communication means changes the division ratio in accordance with the frequency of said first clock signal, and wherein when division ratio data which indicates the changed division ratio has been transferred to said first communication means, said first division ratio control means changes the division ratio in said first frequency division circuit based on the transferred division ratio data.

3. The information processing device as defined in claim 2, further comprising a central processing unit for executing instructions, wherein said first communication means transfers data for debugging to and from said second information processing device that acts as a debugging tool.

4. The information processing device as defined in claim 3, wherein said first clock signal is used as a clock signal for sampling trace data after a transition from a debugging mode to a user program execution mode.

5. Electronic equipment comprising:

the information processing device of claim 4;

an input source of data to be processed by the information processing device; and an output device for outputting data that has been processed by the information processing device.

6. Electronic equipment comprising:

the information processing device of claim 2;

an input source of data to be processed by the information processing device; and an output device for outputting data that has been processed by the information processing device.

7. Electronic equipment comprising:

the information processing device of claim 3;

an input source of data to be processed by the information processing device; and an output device for outputting data that has been processed by the information processing device.

8. The information processing device as defined in claim 1, further comprising a central processing unit for executing instructions, wherein said first communication means transfers data for debugging to and from said second information processing device that acts as a debugging tool.

9. The information processing device as defined in claim 8,
wherein said first clock signal is used as a clock signal for sampling trace data after a transition from a debugging mode to a user program execution mode.

10. Electronic equipment comprising:

the information processing device of claim 9;

an input source of data to be processed by the information processing device; and an output device for outputting data that has been processed by the information processing device.

11. Electronic equipment comprising:

the information processing device of claim 8;

an input source of data to be processed by the information processing device; and an output device for outputting data that has been processed by the information processing device.

12. Electronic equipment comprising:

the information processing device of claim 1;

an input source of data to be processed by the information processing device; and an output device for outputting data that has been processed by the information processing device.

* * * * *